US010783158B2

(12) United States Patent
D'Ercoli et al.

(10) Patent No.: US 10,783,158 B2
(45) Date of Patent: Sep. 22, 2020

(54) METHOD AND ALGORITHMS FOR AUTO-IDENTIFICATION DATA MINING THROUGH DYNAMIC HYPERLINK SEARCH ANALYSIS

(71) Applicant: Datalogic IP Tech, S.r.l., Bologna (IT)

(72) Inventors: Francesco D'Ercoli, Bologna (IT);
Marco Cumoli, Monte San Pietro (IT);
Francesco Paolo Muscaridola, Bologna (IT); Donald Bressan, Bologna (IT)

(73) Assignee: Datalogic IP Tech, S.R.L., Bologna (IT)

( * ) Notice: Subject to any disclaimer, the term of this patent is extended or adjusted under 35 U.S.C. 154(b) by 478 days.

(21) Appl. No.: 15/383,977

(22) Filed: Dec. 19, 2016

(65) Prior Publication Data
US 2018/0173770 A1 Jun. 21, 2018

(51) Int. Cl.
*G06F 16/00* (2019.01)
*G06F 16/2458* (2019.01)
(Continued)

(52) U.S. Cl.
CPC ........ *G06F 16/2465* (2019.01); *G06F 16/951* (2019.01); *G06F 16/972* (2019.01)

(58) Field of Classification Search
CPC combination set(s) only.
See application file for complete search history.

(56) References Cited

U.S. PATENT DOCUMENTS 6,199,081 B1 * 3/2001 Meyerzon ............. G06F 40/117
715/210
6,424,966 B1 * 7/2002 Meyerzon ............. G06F 16/951
707/610
(Continued)

FOREIGN PATENT DOCUMENTS

WO 99/57649 A2 11/1999
WO 00/43918 A2 7/2000
(Continued)

OTHER PUBLICATIONS

Chakrabarti et al., "Focused crawling: a new approach to topic-specific Web resource discovery," *Computer Networks* 31(11-16):1623-1640, 1999.
(Continued)

*Primary Examiner* — Farhan M Syed
(74) *Attorney, Agent, or Firm* — Cozen O'Connor P.C.

(57) ABSTRACT

A system and method of processing and analyzing data captured by automatic data collection ("ADC") readers. The ADC readers encapsulate the captured data in markup language pages and associate various metadata with these pages. A markup language document analyzer identifies associations or links between the meta-data stored in multiple markup language pages. Once an association is detected, the analyzer stores a corresponding hyperlink in one or both of the associated HTML pages 102. After the hyperlinks are stored, a rankings engine may rank the markup language pages based on the hyperlinks that have been stored. The rankings engine may continue to rank the pages as new links are identified and as new pages are created and stored. Queries related to the data received from the ADC readers 100 may be received and processed based upon the rankings of the processed markup language pages.

40 Claims, 12 Drawing Sheets

(51) Int. Cl.
*G06F 16/951* (2019.01)
*G06F 16/958* (2019.01)

(56) References Cited

U.S. PATENT DOCUMENTS

| | | | | |
|---|---|---|---|---|
| 6,539,422 | B1* | 3/2003 | Hunt | G06Q 30/06 |
| | | | | 709/217 |
| 6,606,744 | B1* | 8/2003 | Mikurak | H04L 29/06 |
| | | | | 717/174 |
| 6,749,120 | B2 | 6/2004 | Hung et al. | |
| 6,877,663 | B2 | 4/2005 | Kelly et al. | |
| 7,003,719 | B1* | 2/2006 | Rosenoff | G06F 16/9558 |
| | | | | 715/205 |
| 7,131,587 | B2 | 11/2006 | He et al. | |
| 7,181,438 | B1* | 2/2007 | Szabo | G06F 21/6245 |
| 7,536,389 | B1* | 5/2009 | Prabhakar | G06F 16/951 |
| 7,685,083 | B2* | 3/2010 | Fairweather | G06F 8/427 |
| | | | | 706/45 |
| 7,748,629 | B2 | 7/2010 | Brock | |
| 7,801,896 | B2* | 9/2010 | Szabo | G06F 21/6245 |
| | | | | 707/739 |
| 8,024,384 | B2* | 9/2011 | Prabhakar | G06F 16/951 |
| | | | | 707/709 |
| 8,322,621 | B2 | 12/2012 | Olmstead | |
| 8,364,540 | B2* | 1/2013 | Soroca | G06Q 30/02 |
| | | | | 705/14.64 |
| 8,459,556 | B2 | 6/2013 | Zhou | |
| 8,488,210 | B2 | 7/2013 | Smith | |
| 8,857,719 | B2 | 10/2014 | Liu et al. | |
| 8,949,184 | B2* | 2/2015 | Sokolan | G06F 16/2358 |
| | | | | 707/634 |
| 8,991,100 | B2 | 3/2015 | Van Camp et al. | |
| 9,058,531 | B2 | 6/2015 | Slutsky | |
| 2002/0117547 | A1 | 8/2002 | Krichever | |
| 2006/0178918 | A1* | 8/2006 | Mikurak | G06Q 10/06375 |
| | | | | 705/7.25 |
| 2007/0112714 | A1* | 5/2007 | Fairweather | G06F 9/4493 |
| | | | | 706/46 |
| 2007/0156677 | A1* | 7/2007 | Szabo | G06F 16/2457 |
| 2009/0198662 | A1* | 8/2009 | Prabhakar | G06F 16/951 |
| 2009/0234711 | A1* | 9/2009 | Ramer | G06F 16/635 |
| | | | | 705/14.66 |
| 2010/0094878 | A1* | 4/2010 | Soroca | G06Q 30/02 |
| | | | | 707/748 |
| 2010/0332583 | A1* | 12/2010 | Szabo | G06F 16/248 |
| | | | | 709/202 |
| 2011/0264628 | A1* | 10/2011 | Sokolan | G06F 16/2358 |
| | | | | 707/634 |
| 2014/0089777 | A1* | 3/2014 | Roiniotis | G06F 3/048 |
| | | | | 715/234 |

FOREIGN PATENT DOCUMENTS

| | | |
|---|---|---|
| WO | 2012/117583 A1 | 9/2012 |
| WO | 2014/110495 A2 | 7/2014 |
| WO | 2015/079461 A1 | 6/2015 |

OTHER PUBLICATIONS

International Search Report and Written Opinion, dated Aug. 25, 2014 for corresponding International Application No. PCT/IT2013/000332, 9 pages.

Lusher et al., "A Relational Hyperlink Analysis of an Online Social Movement," *Journal of Social Structure* 12(5), 2011, 36 pages.

McQueen, "Data Collection System and Method That Detect Electronic Device Displays Via Fresnel Patterns," U.S. Appl. No. 14/871,542, filed Sep. 30, 2015, 51 pages.

Newman, "The structure and function of complex networks," *Siam Rev.* 45(2):167-256, 2003.

Rogers, "Issue Mapping Contextual Essay," Issue Crawler Web Network Mapping Software and Allied Tools, 2007, 7 pages.

Wong et al., "Design of a Crawler for Online Social Networks Analysis," *WSEAS Transactions on Communications* 13:263-274, 2014.

Extended European Search Report, dated Apr. 6, 2018 for corresponding European Application No. EP 17 20 7338, 8 pages.

* cited by examiner

METHOD AND ALGORITHMS FOR AUTO-IDENTIFICATION DATA MINING THROUGH DYNAMIC HYPERLINK SEARCH ANALYSIS

TECHNICAL FIELD

The present disclosure generally relates to collecting and analyzing data collected by automatic data collection (ADC) readers, and more particularly, to storing such data in Web pages that can be hyperlinked and searched.

BACKGROUND

Description of the Related Art

The collection of data using Automatic Data Collection ("ADC") readers has become ubiquitous, such that data collected from RFID interrogators, machine-readable symbol readers (e.g., one-dimensional or barcode readers, two-dimensional or QR readers), magnetic stripe readers, and other sources has significantly increased. This large volume of data provides an opportunity in which marketing, maintenance, and other duties could be improved if the collected data could be analyzed efficiently. Unfortunately, there is no consensus on how to perform such an analysis.

BRIEF SUMMARY

Although powerful Web search engines are available, the type of data captured by the ADC readers may not be conducive to conventional searching by such technology because such data lacks hyperlinks and in some instances, is comprised of pictures or signaling data instead of words. In addition, using conventional database searches for the ADC reader data may result in connections or relationships that are apparent when considering multiple types of data (e.g., location and time) being missed.

A method of operation in an automatic data collection (ADC) reader may be summarized as including: capturing, via at least one transducer, object identification data from a data carrier associated with a first object, the object identification data including at least one identifier that identifies the first object; determining, via a metadata controller, at least one piece of metadata associated with the first object; encapsulating, via a markup language framework, at least a portion of the object identification data and the metadata within a markup language document without any hyperlinks in the markup language document; and transmitting, via at least one transmitter, the markup language document, which contains no hyperlinks, from the ADC reader to a second device.

The ADC reader may be chosen from the group consisting of a machine-readable symbol reader for optically reading information from machine-readable symbols, a radio frequency identification (RFID) interrogator, a magnetic stripe reader, and an optical character recognition (OCR) scanner. The at least one piece of metadata may include at least one of: time data, location data, type of ADC reader data, network identification data for the ADC reader, and an indication of whether a measurement of the object identification data was successful. The markup language document may be a Web page. The markup language document may be an HTML page. The at least one identifier may uniquely identify the first object from other objects having respective data carriers that include respective object identification data.

An automatic data collection (ADC) reader may be summarized as including: at least one transducer that captures object identification data from a data carrier associated with an object, the object identification data including at least one identifier that identifies the object; a metadata controller that determines at least one piece of metadata associated with the object; a markup language framework that encapsulates the object identification data and the metadata within a markup language document; and at least one communications port that transmits the markup language document to a second device, wherein the transmitted markup language document contains no hyperlinks.

The ADC reader may be chosen from the group consisting of a machine-readable symbol reader for optically reading information from machine-readable symbols, a radio frequency identification (RFID) interrogator, a magnetic stripe reader, and an optical character recognition (OCR) scanner. The at least one piece of metadata may include at least one of: time data, location data, type of ADC reader data, network identification data for the ADC reader, and an indication of whether a measurement of the object identification data was successful. The markup language document may be a Web page. The markup language document may be an HTML page. The at least one identifier may uniquely identify the object from other objects having respective data carriers that include respective object identification data.

A method of operation for an inverse crawling device may be summarized as including: receiving, via a first transceiver, first object identification data associated with a first object and transmitted from a first automatic data collection (ADC) reader, the first object identification data encapsulated within a first markup language document, wherein the first markup language document includes at least one piece of first metadata related to the first object identification data; receiving, via the first transceiver or via a second transceiver, second object identification data encapsulated within a second markup language document, wherein the second markup language document includes at least one piece of second metadata related to the second objection identification data; creating in the first markup language document a hyperlink to the second markup language document, wherein the hyperlink is created by a markup language document analyzer in response to identifying a relationship between the at least one piece of first metadata and the at least one piece of second metadata; receiving, from a user interface, a query related to the first object; and providing, via the user interface, results that include the first markup language document.

The first ADC reader may be chosen from the group consisting of a machine-readable symbol reader for optically reading information from machine-readable symbols, a radio frequency identification (RFID) interrogator, a magnetic stripe reader, and an optical character recognition (OCR) scanner. The first object identification data and the at least one piece of first metadata may be encapsulated within the first markup language document by the first ADC reader. The at least one piece of first metadata may include at least one of: time data, location data, type of first ADC reader data, network identification data for the first ADC reader, and an indication of whether a measurement of the first object identification data was successful. Identifying a relationship between the at least one piece of second metadata and the at least one piece of first metadata may further include determining that a similarity criterion between the at least one piece of first metadata and the at least one piece of second metadata exceeds a threshold value. The hyperlink between the first markup language document and the second markup language document may be a directional hyperlink indicating that the first markup language document includes a citation to the second markup language document. The directional hyperlink may be determined based on a probability parameter, the probability parameter having been set before the directional link is created. The probability parameter may be based on a comparison of a first time that the first object identification data is captured and a second time that the second object identification data is captured. The method may further include: searching markup language documents containing object identification data in response to receiving the query, wherein the searching may be performed using a Webpage search engine. The method may further include: indexing the first markup language document and the second markup language document in an indexed table. At least one of the first markup language document and the second markup language document may be a Web page. At least one of the first markup language document and the second markup language document may be an HTML page. The first ADC reader may capture the first object identification data from a first carrier associated with a first object at a first time and the first ADC reader may capture the second object identification data from a second carrier associated with a second object at a second time. The first ADC reader may capture the first object identification data from a first data carrier associated with a first object at a first time, and a second ADC reader may capture the second object identification data from the first data carrier associated with the first object at a second time. The first object identification data may include at least one identifier that uniquely identifies the first object from other objects having respective identifiers. The query may be received from a mobile device.

An inverse markup-page crawler may be summarized as including: one or more transceivers that receive first object identification data associated with a first object and transmitted from a first ADC reader, the first object identification data encapsulated within a first markup language document, wherein the first markup language document includes at least one piece of first metadata related to the first object identification data; and receive second object identification data encapsulated within a second markup language document, wherein the second markup language document includes at least one piece of second metadata related to the second objection identification data; and a markup language document analyzer that creates in the first markup language document a hyperlink to the second markup language document, wherein the hyperlink is created in response to an identification of a relationship between the at least one piece of first metadata and the at least one piece of second metadata; wherein the one or more transceivers further receive a query from a user interface related to the first object and provide results to the user interface that include the first markup language document.

The first ADC reader may be chosen from the group consisting of a machine-readable symbol reader for optically reading information from machine-readable symbols, a radio frequency identification (RFID) interrogator, a magnetic stripe reader, and an optical character recognition (OCR) scanner. The first object identification data and the at least one piece of first metadata may be encapsulated within the first markup language document by the first ADC reader. The at least one piece of first metadata may include at least one of: time data, location data, type of first ADC reader data, network identification data for the first ADC reader, and an indication of whether a measurement of the first object identification data was successful. Identifying a relationship between the at least one piece of second metadata and the at least one piece of first metadata may further include determining that a similarity criterion between the at least one piece of first metadata and the at least one piece of second metadata exceeds a threshold value. The hyperlink between the first markup language document and the second markup language document may be a directional hyperlink that indicates that one of the first markup language document includes a citation to the second markup language document. The directional hyperlink may be determined based on a probability parameter, the probability parameter having been set before the directional link is created. The probability parameter may be based on a comparison of a first time that the first object identification data is captured and a second time that the second object identification data is captured. The inverse markup-page crawler may further include: a Webpage search engine that searches markup language documents containing object identification data in response to receiving the query. The inverse markup-page crawler may further include: non-transitory computer readable media that stores an indexed table of a set of markup language documents, wherein the set of markup language documents includes the first markup language document and the second markup language document. At least one of the first markup language document and the second markup language document may be a Web page. At least one of the first markup language document and the second markup language document may be an HTML page. The first ADC reader may capture the first object identification data from a first data carrier associated with a first object at a first time and may capture the second object identification data from a second data carrier associated with a second object at a second time. The first ADC reader may capture the first object identification data from a first data carrier associated with a first object at a first time and a second ADC reader may capture the second object identification data at a second time, and wherein the second object identification data may be from the first data carrier associated with the first object. The first object identification data may include at least one identifier that uniquely identifies the first object from other objects having respective identifiers. The query may be received from a mobile device.

A method of operation for a ranking engine may be summarized as including: receiving, via a first transceiver, first object identification data transmitted from a first automatic data collection (ADC) reader, the first object identification data associated with a first object and encapsulated within a first markup language document, wherein the first markup language document includes first metadata related to the first object identification data; ranking, using a rankings engine, the first markup language document within a set of markup language documents based at least in part on a set of hyperlinks between the first markup language document and the other markup language documents within the set of markup language documents, wherein the hyperlinks between the first markup language document and the other markup language documents are determined after the first markup language document is received via the transceiver; receiving, from a user interface, a query related to the first object; and providing, via the user interface, results to the query that include the first markup language document.

The first ADC reader may be chosen from the group consisting of a machine-readable symbol reader for optically reading information from machine-readable symbols, a radio frequency identification (RFID) interrogator, a magnetic stripe reader, and an optical character recognition (OCR) scanner. The first object identification data and the at least one piece of first metadata may be encapsulated within the first markup language document by the first ADC reader. At least one piece of first metadata may include at least one of: time data, location data, type of first ADC reader data, network identification data for the first ADC reader, and an indication of whether a measurement of the first object identification data was successful. At least one of the hyperlinks in the set of hyperlinks may be a directional hyperlink indicating that the first markup language document cites to another markup language document within the set of markup language documents. The directional hyperlink may be determined based on a probability parameter, the probability parameter having been set before the directional hyperlink is created. The probability parameter may be based on a comparison of a first time that the first object identification data is captured and a second time that the other markup language document is captured. The method may further include: searching the set of markup language documents containing object identification data in response to receiving the query, wherein the searching is performed using a Webpage search engine. The first markup language document may be a Web page. The first markup language document may be an HTML page. The method may further include: storing in non-transitory computer readable media an indexed table of the set of markup language documents. The method may further include: dynamically updating, via the rankings engine, the ranking of the set of markup language documents when a new link is added to the set of links. The query may be received from a mobile device. The first object identification data may include at least one identifier that uniquely identifies the first object from other objects having respective identifiers.

A ranking engine may be summarized as including: one or more transceivers that receive first object identification data transmitted from a first automatic data collection (ADC) reader, the first object identification data associated with a first object and encapsulated within a first markup language document, wherein the first markup language document includes at least one piece of first metadata related to the first object identification data; and a rankings engine that ranks the first markup language document within a set of markup language documents based at least in part on a set of hyperlinks between the first markup language document and the other markup language documents within the set of markup language documents; wherein the one or more transceivers further receive a query from a user interface, the query related to the first object, and provide results to the user interface in response to the query, the results which include the first markup language document.

The first ADC reader may be chosen from the group consisting of a machine-readable symbol reader for optically reading information from machine-readable symbols, a radio frequency identification (RFID) interrogator, a magnetic stripe reader, and an optical character recognition (OCR) scanner. The first object identification data and the at least one piece of first metadata may be encapsulated within the first markup language document by the first ADC reader. The at least one piece of first metadata may include at least one of: time data, location data, type of first ADC reader data, network identification data for the first ADC reader, and an indication of whether a measurement of the first object identification data was successful. At least one of the hyperlinks in the set of hyperlinks may be a directional hyperlink indicating that the first markup language document cites to another markup language document within the set of markup language documents. The directional hyperlink may be determined based on a probability parameter, the probability parameter having been set before the directional hyperlink is created. The probability parameter may be based on a comparison of a first time that the first object identification data is captured and a second time that the other markup language document is captured. The method executed by the computer system may further include: a Webpage search engine that searches the set of markup language documents containing object identification data in response to receiving the query. The first markup language document may be a Web page. The first markup language document may be an HTML page. The ranking engine may further include: non-transitory computer readable media that stores an indexed table of the set of markup language documents. The rankings engine may further dynamically update the ranking of the set of markup language documents when a new link is added to the set of links. The query may be received from a mobile device. The first object identification data may include at least one identifier that uniquely identifies the first object from other objects having respective identifiers.

A method of operation for a system of automatic data collection (ADC) readers may be summarized as including: capturing, via one or more transducers, first object identification data from a first data carrier associated with a first object, the first object identification data including at least a first identifier that identifies the first object; determining, via a first metadata controller, at least one piece of first metadata associated with the first object; encapsulating, via a first markup language framework, the first object identification data and the at least one piece of first metadata within a first markup language document; capturing, via the one or more transducers, second object identification data from a second data carrier associated with a second object, the second object identification data including at least a second identifier that identifies the second object; determining, via a second metadata controller, at least one piece of second metadata associated with the second object; encapsulating, via a second markup language framework, the second object identification data and the at least one piece of second metadata within a second markup language document; and creating in the first markup language document a hyperlink to the second markup language document, wherein the hyperlink is created by a markup language document analyzer in response to identifying a relationship between the at least one piece of first metadata and the at least one piece of second metadata; ranking, using a rankings engine, the first markup language document within a set of markup language documents based at least in part on a set of hyperlinks between the first markup language document and the other markup language documents within the set of markup language documents; receiving, from a user interface, a query related to the first object; and providing, via the user interface, results that include the first markup language document.

The first ADC reader may be chosen from the group consisting of a machine-readable symbol reader for optically reading information from machine-readable symbols, a radio frequency identification (RFID) interrogator, a magnetic stripe reader, and an optical character recognition (OCR) scanner. The first object identification data and the at least one piece of first metadata may be encapsulated within the first markup language document by the first ADC reader. At least one piece of first metadata may include at least one of: time data, location data, type of first ADC reader data, network identification data for the first ADC reader, and an indication of whether a measurement of the first object identification data was successful. Identifying a relationship between the at least one piece of second metadata and the at least one piece of first metadata may further include determining that a similarity criterion between the at least one piece of first metadata and the at least one piece of second metadata exceeds a threshold value. The hyperlink between the first markup language document and the second markup language document may be a directional hyperlink indicating that one of the first markup language document and the second markup language document includes a citation to the other one of the first markup language document and the second markup language document. The directional hyperlink may be determined based on a probability parameter, the probability parameter having been set before the directional link is created. The probability parameter may be based on a comparison of a first time that the first object identification data is captured and a second time that the second object identification data is captured. The method may further include: searching the set of markup language documents containing object identification data in response to receiving the query, wherein the searching may be performed using an Webpage search engine. The method may further include: storing in non-transitory computer readable media an indexed table of the set of markup language documents. At least one of the first markup language document and the second markup language document may be a Web page. At least one of the first markup language document and the second markup language document may be an HTML page. A first ADC reader may capture the first object identification data from a first data carrier at a first time and may capture the second object identification data from a second data carrier at a second time. The method may further include: dynamically updating, via the rankings engine, the ranking of at least one of the first markup language document and the second markup language document when a new link is added to the set of links. The query may be received from a mobile device. The first identifier may uniquely identify the first object from other objects having respective data carriers that include respective object identification data.

A system of automatic data collection (ADC) readers may be summarized as including: one or more transducers that capture first object identification data from a first data carrier associated with a first object, and that capture second object identification data from a second data carrier associated with a second object; one or more metadata controllers that determine at least one piece of first metadata associated with the first object, and that determine at least one piece of second metadata associated with the second object; one or more markup language frameworks that encapsulate the first object identification data and the at least one piece of first metadata within a first markup language document, and that encapsulate the second object identification data and the at least one piece of second metadata within a second markup language document; a markup language document analyzer that creates in the first markup language document a hyperlink to the second markup language document, wherein the hyperlink is created in response to identifying a relationship between the at least one piece of first metadata and the at least one piece of second metadata; a rankings engine that ranks the first markup language document within a set of markup language documents based at least in part on a first set of hyperlinks between the first markup language document and the other markup language documents within the set of markup language documents, and that ranks the second markup language document within the set of markup language documents based at least in part on a second set of hyperlinks between the second markup language document and the other markup language documents with the set of markup language documents; and one or more network interfaces that receive a query related to the first object and provide results that include the first markup language document.

The first ADC may be chosen from the group consisting of a machine-readable symbol reader for optically reading information from machine-readable symbols, a radio frequency identification (RFID) interrogator, a magnetic stripe reader, and an optical character recognition (OCR) scanner. The first object identification data and the at least one piece of first metadata may be encapsulated within the first markup language document by a first ADC reader. At least one piece of first metadata may include at least one of: time data, location data, type of first ADC reader data, network identification data for the first ADC reader, and an indication of whether a measurement of the first object identification data was successful. Identifying a relationship between the at least one piece of second metadata and the at least one piece of first metadata may further include determining that a similarity criterion between the at least one piece of first metadata and the at least one piece of second metadata exceeds a threshold value. The hyperlink between the first markup language document and the second markup language document may be a directional hyperlink indicating that one of the first markup language document and the second markup language document includes a citation to the other one of the first markup language document and the second markup language document. The directional hyperlink may be determined based on a probability parameter, the probability parameter having been set before the directional link is created. The probability parameter may be based on a comparison of a first time that the first object identification data is captured and a second time that the second object identification data is captured. The system of ADC readers may further include: a Webpage search engine that searches markup language documents containing object identification data in response to receiving the query. The system of ADC readers may further include: storing in non-transitory computer readable media an indexed table of the set of markup language documents. At least one of the first markup language document and the second markup language document may be a Web page. At least one of the first markup language document and the second markup language document may be an HTML page. The first ADC reader may capture the first object identification data from a first data carrier at a first time and may capture the second object identification data from a second data carrier at a second time. The rankings engine may further dynamically update the ranking of at least one of the first markup language document and the second markup language document when a new link is added to the set of links. The query may be received from a mobile device. The first identifier may uniquely identify the first object from other objects having respective data carriers that include respective object identification data.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with automatic data collection devices, computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
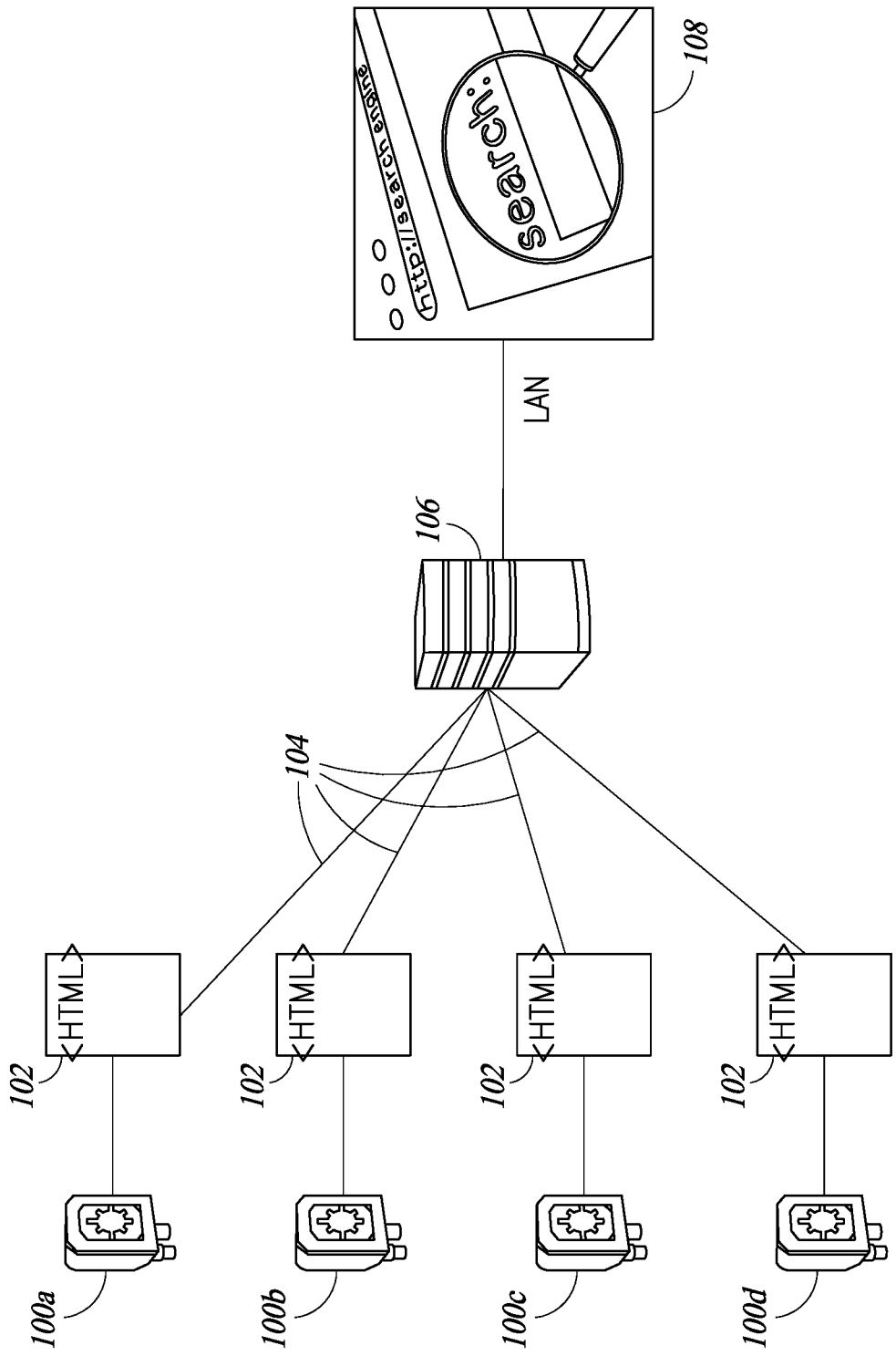
FIG. 1 is a schematic diagram of a network of automatic data collection ("ADC") readers and a server that receives data from the ADC readers, according to one illustrated implementation.

FIG. 1 is a diagram of a network of automatic data collection ("ADC") readers, including a machine-readable symbol reader 100*a*, a radio frequency identification ("RFID") interrogator 100*b*, a magnetic stripe reader 100*c*, and an optical character recognition ("OCR") scanner 100*d* (collectively, "the ADC readers 100"), along with a server 106 that receives data from the ADC readers 100, according to one illustrated implementation. The ADC readers 100 may be placed within a building, warehouse, factory, campus, or any other location to capture machine-readable identification data associated with various objects or people as those objects or people migrate and move throughout that location or otherwise reside at a location. The ADC readers 100 encapsulate the captured identification data in markup language pages, such as an HTML page 102, and further associate various metadata with the captured identification data as part of the respective HTML page 102. As discussed below, this metadata may include, for example, information related to the location or time that the identification data was captured, information about the specific reader that captured the identification data, or an indication that the capture of the identification data was successful. After the ADC readers 100 encapsulates the identification data along with the appropriate meta-data in the HTML page 102, the ADC readers 100 may then transmit the HTML page 102 over one or more network connections 104 to a server 106 that receives HTML pages 102 from other ADC readers 100 in the network of ADC readers 100.

The server 106 may perform various operations on the data received from the ADC readers 100 to process and analyze the received data. For example, the server 106 may use a markup language document analyzer to identify associations or links between the meta-data stored in the received HTML pages 102. Once the markup language document analyzer detects an association between two HTML pages 102, it may create a hyperlink between the two HTML pages 102, as discussed in more detail below. In some implementations, the hyperlink is bidirectional in which a hyperlink is stored in each of the two associated HTML pages 102 that points to the other HTML page 102. In some implementations, the hyperlink is unidirectional so that a hyperlink is stored in only one of the associated HTML pages 102 and points to the other, associated HTML page 102. The markup language document analyzer can continuously identify associations and create hyperlinks as new HTML pages 102 are received from the ADC readers 100.

Once the hyperlinks are stored in the HTML pages 102, the server 106 may use a rankings engine to rank the HTML pages 102 based on the hyperlinks that have been stored as part of the various HTML pages 102. The rankings engine may continue to rank the HTML pages 102 as new hyperlinks are identified and as new HTML pages 102, or other markup language documents, are stored by the server 106. In some implementations, the ranked HTML pages 102 may be stored in an indexed table. The server 106 may further receive queries 108 from users, in which the queries 108 relate to the data received from the ADC readers 100. Because this data is stored in HTML pages 102, or in other markup language documents, the server 106 may use a Web based search engine to search the identification data received from the ADC readers 100. The use of hyperlink-enabled HTML pages 102, or other markup language documents, along with Web based search engines enables quicker and more efficient and thorough searching of the ADC reader 100 data as compared to conventional methods for searching such data. Such searches may also detect relationships between identification data that may not be apparent, and thus may be missed, by conventional searching techniques and methods.

Figure 2:
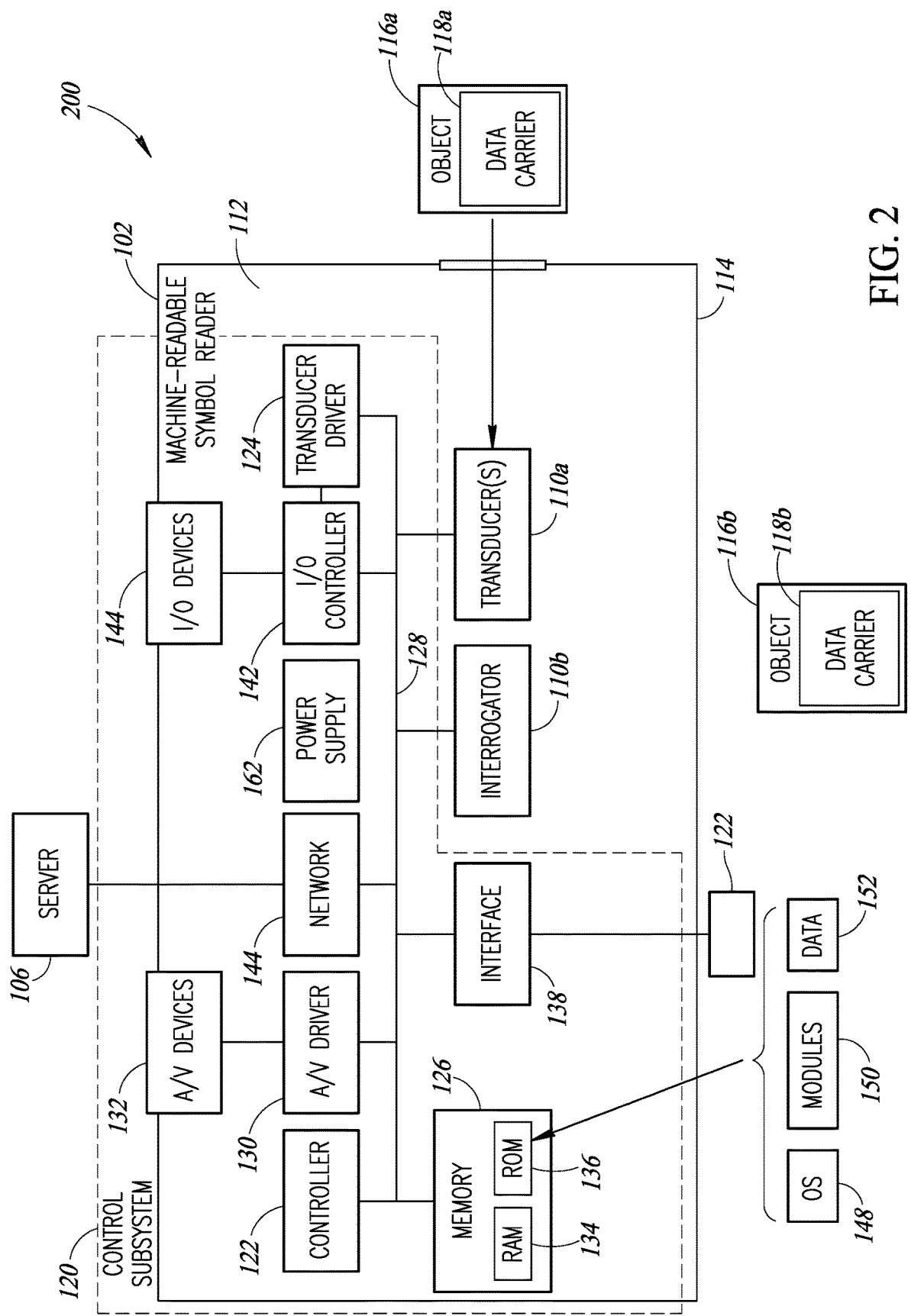
FIG. 2 is a block diagram of a dual function ADC reader, a first object bearing a machine-readable symbol as a data carrier to be read, and a second object containing an RFID transponder to be read, according to at least one illustrated implementation.

FIG. 2 shows a multi-function ADC reader 200 that includes a transducer 110a for capturing images of machine-readable symbols and a transceiver/interrogator 110b for capturing data stored on RFID chips. FIG. 2 also shows a first object 116a bearing a machine-readable symbol as a data carrier 118a to be read and a second object 116b containing an RFID transponder as a data carrier 118b to be read, according to at least one illustrated implementation. The multi-function ADC reader 200 includes one or more transducers 110a that can capture images, sounds, or other information from the environment proximate the multi-function ADC reader 200 within the transducers 110a detection range. For example, the transducer 110a may include an imager (e.g., CCD array) that captures images of one or more fields of view extending outward from the ADC reader 100, or may include an optical detector (e.g., photodiode) that detects a scanning laser beam reflected or otherwise returned to the multi-function ADC reader 200. The transducer 110a is located on an inner side 112 of the multi-function ADC reader 200, e.g., in the interior of a housing 114. The multi-function ADC reader 200 may include one or more of a machine-readable symbol reader engines to optionally illuminate and to optically read information from machine-readable symbols (e.g., one-dimensional or linear symbols such as barcode symbols, two-dimensional symbols for instance quick response (QR) code symbols). Additionally, the multi-function ADC reader 200 includes the RFID interrogator 110b which includes at least one radio (e.g., wireless transmitter, wireless receiver, wireless transceiver) that wirelessly interrogates RFID transponders 118b, for instance, using interrogation signals and response signals in the radio or microwave frequency portions of the electromagnetic spectrum. Additionally or alternatively, the multi-purpose ADC reader 200 may include or take the form of a magnetic stripe reader 100c that includes a magnetic sensor or transducer that reads information encoded in magnetic polarization of a magnetic stripe. Additionally or alternatively, the multi-purpose ADC reader 200 may include or take the form of an optical character recognition (OCR) scanner 100d which captures optical images and converts the optical images to alphanumeric characters (e.g., text, numbers). In some implementations, an ADC reader 100 or a multi-function ADC reader 200 may include biometric readers and voice recognition interfaces.

FIG. 2 also illustrates a first item or object 116a positioned outside a barrier, e.g., exterior to the housing 114, within the detection range of the transducers 110a. The first object 116a includes a first data carrier 118a (e.g., a barcode symbol, QR code symbol, magnetic stripe, document, etc.) that contains a machine-readable representation that the multi-function ADC reader 200 can detect and/or decode.

The transducers 110a form an electronic representation of the first data carrier 118a. For example, the transducers 110a may comprise a wide range of image sensors that convert an optical images (or another wavelength in the electromagnetic spectrum) into an electrical signal. The transducers 110a may comprise a digital sensor, such as a charge-coupled device (CCD) sensor array or complementary metal-oxide semiconductor (CMOS) sensor array, both of which form a one-dimensional or two-dimensional array of pixels, which together constitute an electronic representation of the image of the first data carrier 118a. The transducers 110a may comprise a photodiode or other sensor that detects an intensity of light returned from the first data carrier 118a, for example a laser beam is emitted by the multi-function ADC reader 200 and that is reflected or otherwise returns from the first data carrier 118a to the multi-function ADC reader 200, encoding information read from the first data carrier 118a in a reflectance profile.

FIG. 2 also illustrates a second item or object 116b positioned exterior to the housing 114 of the multi-function ADC read 200 and within the detection range of the RFID interrogator 110b. The second object 116b includes a first data carrier 118a (e.g., RFID transponder, etc.) that upon interrogator, emits a waveform that carries data that the multi-function ADC reader 200 can detect and/or decode.

The interrogator 110b forms an electronic representation of the second data carrier 118b. For example, in a passive RFID system, the waveform emitted by the interrogator 110b provides sufficient energy to the RFID transponder 118b; upon being energize, the RFID transponder 118b transmits a responsive waveform that includes data from the data carrier 118b. In some implementations, the RFID interrogator 110b and RFID transponder 118b may be part of an active RFID system in which the RFID transponder 118b has its own power source. In such an implementation, the transponder 118b continuously transmits data from the data carrier 118b without being activated by an interrogator 110b. In either type of implementation, the waveform transmitted by the second data carrier 118b is received by the interrogator 110b, which processes and digitizes the waveform in order to capture the data being transmitted from the second data carrier 118b.

The multi-function ADC reader 200 includes a control subsystem (enclosed by broken line polygon) 120 that controls operation of the various components of the multi-function ADC reader 200, for example controlling operation of the transducers 110a or interrogators 110b, and/or to process data collected by the transducers 110a or interrogators 110b. The control subsystem can, for example include one or more of: a controller 122, sensor drivers or controllers 124, one or more non-transitory media 126, and other components, for instance as discussed herein.

In response to receiving an instruction from the controller 122, the transducers 110a and/or interrogator 110b capture or acquire one or more images, reflected light, sounds, electromagnetic waveform, or other physical phenomena within the detection range of the transducers 110a or interrogators 110b. One or more sensor drivers or controllers 124 are provided. The sensor driver 124 is communicatively coupled and operable to apply signals to drive the transducer 110a to, for example, capture data from data carriers 118a that come within the detection range of the transducers 110a. The sensor driver 124 is communicatively coupled and operable to apply signals to drive the RFID interrogator 110b to, for example, capture data from data carriers 118b that come within the detection range of the interrogator 110b. The transducers 110a and/or interrogator 110b are communicatively coupled to the controller 122, which may be, for example, one or more of a processor, microprocessor, controller, microcontroller, digital signal processor (DSP), graphical processing unit (GPU) or the like (generally "processor"). Some implementations may include a dedicated machine-readable symbol scan engine or module as part of the controller 122. Some implementations may include a dedicated voice to text engine or module as part of the controller 122. The communicative coupling may be via a bus 128 or other communication mechanism, such as direct connections of a serial, parallel, or other type. The controller 122 generally controls and coordinates the operation of other devices to which it is connected, such as one or more of the transducers 110a and interrogators 110b.

The controller 122 generally controls and coordinates the operation of an audio/visual (A/V) driver 130. The A/V driver 130 is optionally included to drive one or more audio devices 132, such as a buzzer, speaker, or other audible indicator, to produce an audible "beep" or other indication when a machine-readable symbol is successfully read. In addition, or alternatively, the A/V driver 130 may drive an LED or other visual indicator device 132 when a machine-readable symbol has been successfully read. Moreover, the controller 122 and/or the bus 128 may interface with other controllers or computers. Some implementations can include a user operable trigger or other switch, operation of which can cause the ADC reader 100 to read machine-readable symbols.

The multi-function ADC reader 200 also includes one or more non-transitory media 126, for example, which may be implemented using one or more standard devices. The memory devices may include, for instance, flash memory, RAM 134, ROM 136, and EEPROM devices. The non-transitory media may also include magnetic or optical storage devices, such as hard disk drives, CD-ROM drives, and DVD-ROM drives. The multi-function ADC reader 200 may also include an interface 138 configured implementations for external drives 140, such as may be accessed over a USB or IEEE 1194 connection.

The multi-function ADC reader 200 may include a number of other components that interface with one another via the bus 128, including an input/output (I/O) controller 142 and one or more I/O devices 144. For example, the I/O controller 142 may implement a display controller, and the I/O devices 144 may include a display device to present data, menus, and prompts, and otherwise communicate with the user via one or more display devices, such as a transmissive or reflective liquid crystal display (LCD) or other suitable display. For example, the I/O controller 142 and I/O device 144 may be operable to display a navigable menu system or graphical user interface (GUI) that allows the user to select the illumination and image capture settings. Also for example, the I/O controller 142 may include one or more speakers or buzzers to produce audible sensations, one or more tactile or haptic engines to produce tactile sensations, one or more lights (e.g., LEDs) to produce visual sensations.

The I/O controller 142 may receive user input from one or more input devices, such as a keyboard, a pointing device, or other wired/wireless input devices, that allow the user to, for example, configure the multi-function ADC reader 200. Other input devices may be included, such as a microphone, touchscreen, touchpad, and trackball. While the input devices may be integrated into the multi-function ADC reader 200 and coupled to the controller 122 via the I/O controller 142, input devices may also connect via other interfaces, such as a connector that includes one or more data interfaces, bus interfaces, wired or wireless network adapters, or modems for transmitting and receiving data. Accordingly, the I/O controller 142 may include one or more of hardware, software, and firmware to implement one or more protocols, such as stacked protocols along with corresponding layers. Thus, the I/O controller 142 may function as one or more of a serial port (e.g., RS232), a Universal Serial Bus (USB) port, or an IR interface. The I/O controller 142 may also support various wired, wireless, optical, and other communication standards.

A network interface 144 provides communications with one or more hosts or other devices (e.g., a computer, a point-of-sale terminal, a point-of-sale computer system, or a cash register), such as the server 106. According to one implementation, the network interface 144 comprises a universal interface driver application-specific integrated circuit (UIDA). The network interface 144 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PC-MCIA), or USB. A wireless connection may use low- or high-powered electromagnetic waves to transmit data using any wireless protocol, such as Bluetooth™, IEEE 802.11b (or other Wi-Fi standards), infrared data association (IrDA), and radiofrequency identification (RFID).

The multi-function ADC reader 200 may also include one or more power supplies 146, which provide electrical power to the various components of the multi-function ADC reader 200 via power connections.

Machine-readable symbol readers according to other implementations may have less than all of these components, may contain other components, or both. For example, the multi-function ADC reader 200 may comprise a machine-readable symbol reader for optically reading information from machine-readable symbols, including a fixed scanner, such as an on-counter scanner or in-counter scanner, or a portable scanner, such as a handheld scanner. The multi-function ADC reader 200 may also include an optical character recognition (OCR) scanner. In addition, the multi-function ADC reader 200 may include a magnetic stripe reader. Such may be particularly useful when employed as a point-of-sale (POS) terminal.

According to one implementation, any number of program modules (i.e., sets of processor-executable instructions and/or data) are stored in the memory 126, including an operating system (OS) 148, one or more application programs or modules 150, such as instructions to implement the methods described herein, and data 152. Any suitable operating system 148 may be employed. The data 152 may include one or more configuration settings or parameters, or may include image data from the transducer 110a, signal data from the interrogator 110b, decoded machine-readable symbol data from the first data carrier 118a, and/or decoded digital data from the second data carrier 118b. One of the program modules 150 may comprise a set of instructions to implement the methods for generating image data using the multi-function ADC reader 200. One of the program modules 150 may comprise a set of instruction for processing the image data to be encapsulated and transmitted elsewhere in the network. One of the program modules 150 may comprise a set of instructions for a markup language framework that controls the construction of one or more markup language pages. One of the program modules 150 may comprise a metadata controller that determines at least a first piece of metadata to incorporate into one or more markup language pages.

Although the description of FIG. 2 relates to a multi-function ADC reader 200 with the capability to capture machine-readable symbol data and RFID data from the machine-readable tag 118a and the RFID transponder 118b, the description of the components and operation of the multi-function ADC reader 200 applies both to single-purpose ADC readers, such as ADC readers 100, as well as to multi-function ADC readers 200 capable of capturing data from different types of data carriers 118.

Figure 3:
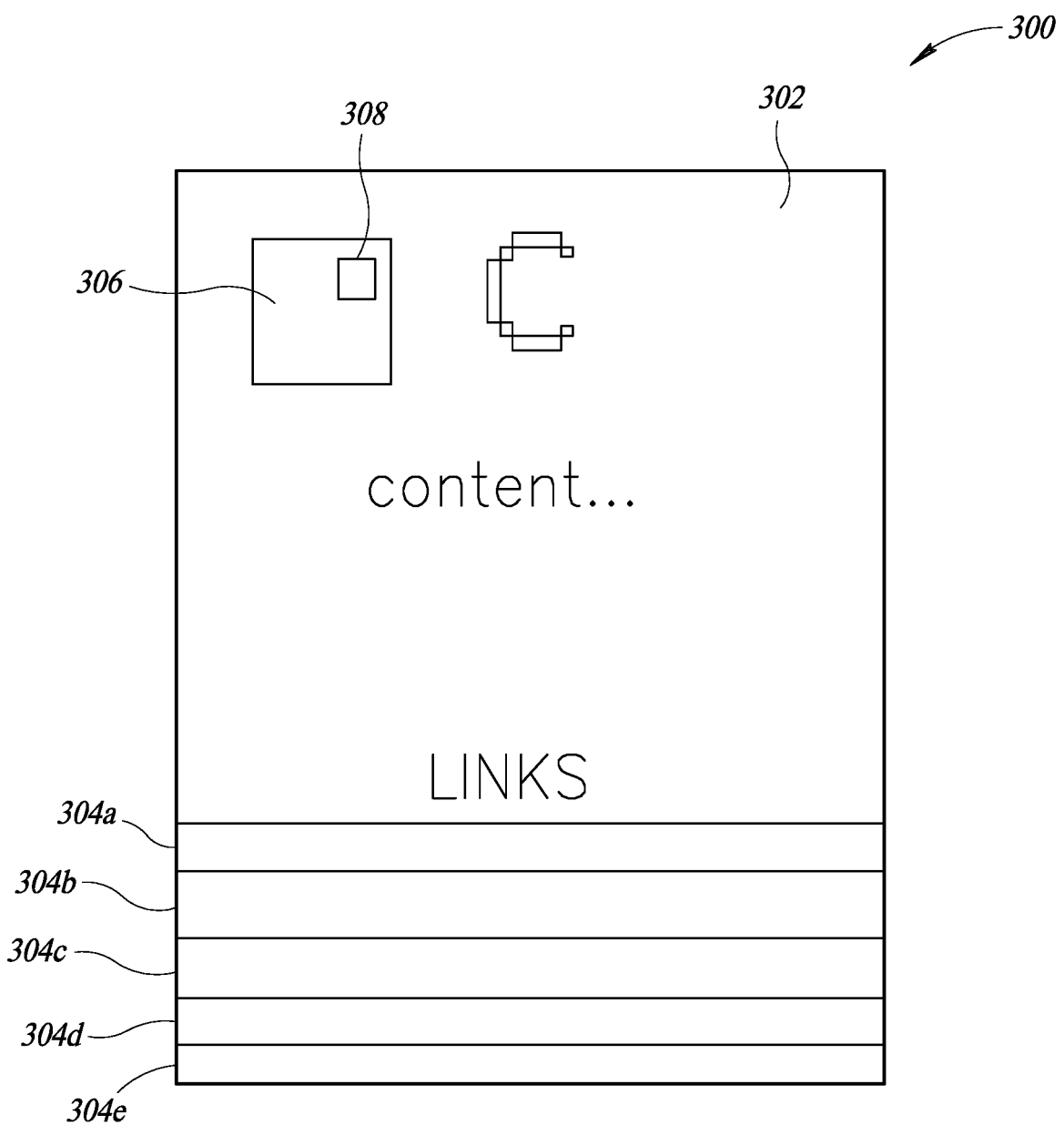
FIG. 3 is a schematic diagram that illustrates a markup language document that encapsulates data collected by an ADC reader, according to one illustrated implementation.

FIG. 3 illustrates a markup language document 300 that encapsulates data collected by an ADC reader 100, according to one illustrated implementation. The markup language document 300 includes a content field 302 and metadata fields 304. The markup language document 300 can be constructed using any number of markup language frameworks and languages, such as the Hyper-Text Markup Language (HTML), the Extensible Markup Language (XML), the Extensible Hyper-Text Markup Language (XHTML), Lamport Tex (LaTex), and other like markup languages that enable tags and links to be incorporated into the resulting documents 300. When the ADC reader 100 detects and captures data from the data carrier 118, the ADC reader 100 encapsulates the resulting data within the content field 302 of the markup language document 300. Such data captured from the data carrier 118 and stored in the content field 302 may include information related to the object 116 to which the data carrier 118 is attached or associated. For example, the data captured from the data carrier 118 may include object identification information 306 that provides information related to the identity or nature of the object 116, for instance a unique identifier that uniquely identifies the object or instance of the object from all other objects or from a defined set of objects. Such object identification data 306 may further include information that specifies the type or class of item to which the object 116 belongs, such as a specific part or component in an assembly or factory. In some implementations, the data captured from the data carrier 118 may provide information regarding the source or ownership of the object 116, such as providing information specifying the specific supplier or manufacturer for, or the geographic origin of, the object 116. In some implementations, the object identification data 306 includes an identifier 308 that uniquely identifies the object 116 from all other objects 116 that are associated with other data carriers 118.

The markup language document 300 also includes one or more metadata fields 304a-304e (collectively, "metadata fields 304") that the ADC reader 100 populates with information and data related to the object 116. For example, the ADC reader 100 may include information in the metadata fields 304 regarding the time that the ADC reader 100 detected and captured the representation of the data carrier 118, the location at which the ADC reader 100 detected and captured the representation of the data carrier 118, and the type of ADC reader 100 that performed the detection and capture. In some implementations, the information stored in the metadata fields 304 by the ADC reader 100 may include network identification data, such as the MAC address and/or IP address, for the ADC reader 100 and an indication of whether a measurement of the object identification data 306 was successful.

In some implementations, the data stored in the metadata fields 304 may be based upon a 5-W schema in which the meta-data fields 304a-304e of the markup language document 300 store at least the following data:

What item was identified: such data may include barcode or QR code;

Where the identification occurred: such data may include GPS coordinates, factory location, or campus building;

When the identification occurred: such data may include date and time information;

Who performed the identification: such data may include identifying network information such as IP and/or MAC addresses for the ADC reader, or a serial number or other type of product identifier for the ADC reader; and Why the identification is notable: such data may include notations specifying that a good read of the data carrier 118 occurred or that a misread of the data carrier 118 occurred. More generally, such data can carry information about diagnostics and alarm events.

In some implementations, each type of data in the 5-W schema may occupy a separate meta-data field 304a-304e in the markup language document 300. Additional metadata fields 304 may be added, including those defined by a user or operator, to the five metadata fields 304a-304e noted above.

As noted earlier, the ADC reader 100 encapsulates the object identification data 306 and the associated meta-data 304 within a markup language document 300. Encapsulating the object identification data 306 and the associated meta-data 304 within the markup language document 300 enables the ADC reader 300 and the network components to transmit this data as a unit over network. Encapsulating the object identification data 306 and the associated meta-data 304 also enables computer components, such as server 106 to process, store, and internally transfer this data also as a unit. Encapsulation may also enable processing devices to identify connections and relationships among and between various objects 116 by considering various different types of metadata 304a-304e, as discussed in more detail herein. Once the ADC reader 100 encapsulates the object identification data 306 and the associated metadata 304a-304e within the markup language document 300, the ADC reader 100 transmits the markup language document 300 to the server 106. In some implementations, the markup language documents 300 transmitted by the ADC reader 100 may not contain any hyperlinks to any other markup language documents 300.

Figure 4:
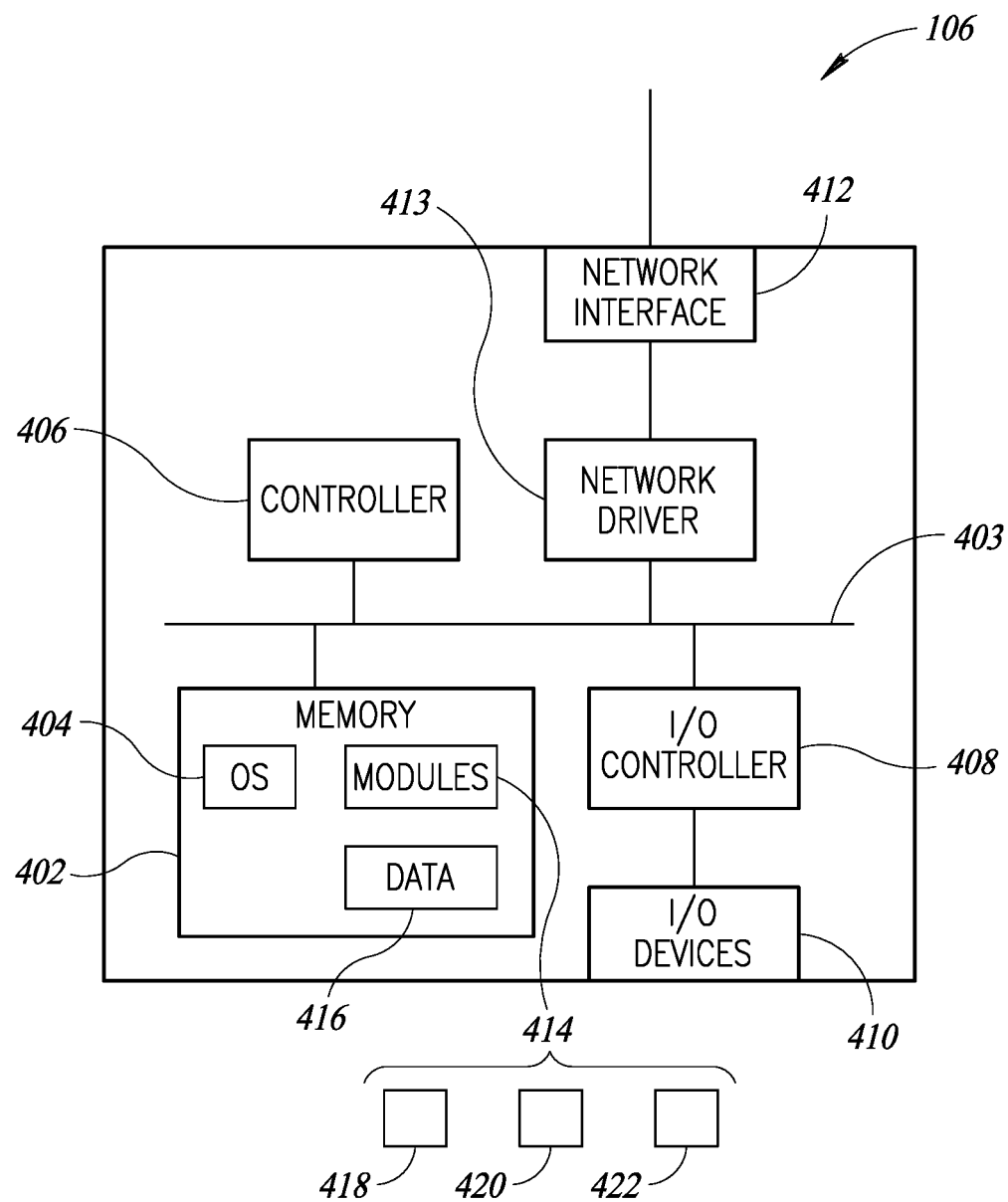
FIG. 4 is a block diagram of a server that analyzes and ranks markup language pages that contain data collected from one or more ADC readers, according to one illustrated implementation.

FIG. 4 shows a server 106 that analyzes and ranks markup language pages 300 that contain data collected from an ADC reader 100, according to one embodiment. The server 106 may, for example take the form of one or more server computers, workstation computers, supercomputers, or personal computers, executing server software or instructions. The server 106 may include one or more non-transitory computer-readable medium 402 (e.g., magnetic or optical hard drives, RAID, RAM, Flash) that stores processor-executable instructions and/or data or other information. The server 106 may include one or more operating systems 404. Such systems 404 may control or coordinate the operation of other systems or components, including a computer system, controller, or processor 406, one or more drivers or controllers 408 for a input and/or output devices 410, such as a monitor or display, a keypad and/or keyboard, and/or a cursor control device such as a mouse, joystick, trackpad, trackball or the like. The various components may be communicative coupled via a bus 403 or other communication mechanism, such as direct connections of a serial, parallel, or other type.

The server 106 may be communicatively coupled to other servers 106 or computers, and/or to one or more ADC readers 100 and/or one or more client devices via one or more networks interfaces 412 that connect, for instance, to a LAN. The network interface 412 may be controlled by a network driver 413. In the case of a wired connection, the network driver 413 may enable communication using any protocol, such as IEEE 802.3 (Ethernet), advanced technology attachment (ATA), personal computer memory card international association (PCMCIA), or USB. The network interface 412 may enable a wireless connection using low- or high-powered electromagnetic waves to transmit data using any wireless protocol, such as Bluetooth™, IEEE 802.11b (or other Wi-Fi standards), infrared data association (IrDA), and radiofrequency identification (RFID). One or more communications channels, for example local area networks (LANs) and Wide Area Networks (WANs), may be used to connect the server 106 with other servers 106.

Although illustrated as a single nontransitory computer- or processor-readable storage medium 402, in many implementations the nontransitory computer- or processor-readable storage medium 402 may constitute a plurality of nontransitory storage media 402. The plurality of nontransitory storage media 402 may be commonly located at a common location, or distributed at a variety of remote locations and thus not be contiguous.

As noted above, the server 106 may be remotely located from the ADC readers 100. The server 106 and ADC reader 100 are capable of communications, for example, via one or more communications channels, for example local area networks (LANs) and Wide Area Networks (WANs). The networks interface 412 may, for instance, connect to packet switched communications networks, such as the Internet, Worldwide Web portion of the Internet, extranets, and/or intranets. The networks interface 412 may connect to various other types of telecommunications networks, such as cellular phone and data networks, and plain old telephone system (POTS) networks. The type of communications infrastructure should not be considered limiting.

According to one implementation, any number of program modules are stored in the nontransitory storage media 402. In addition to the operating system (OS) 404, one or more application programs or modules 414, such as instructions to implement the methods described herein, and data 416. Any suitable operating system 404 may be employed. The data 416 may include one or more configuration settings or parameters, or may include data received from the ADC reader 100. One of the program modules 414 may comprise a set of instructions for a markup language document analyzer 418 (hereinafter, "the analyzer module") that detects relationships between markup language documents 300 and generates hyperlinks involving the related markup language documents 300. One of the program modules 414 may comprise a set of instruction for a rankings engine 420 that ranks the various markup language documents 300. One of the program modules 414 may comprise a set of instruction 422 for receiving and responding to queries 108 received from users or other processes, and related to the objects 116 being monitored by the network of ADC readers 100.

Figure 5:
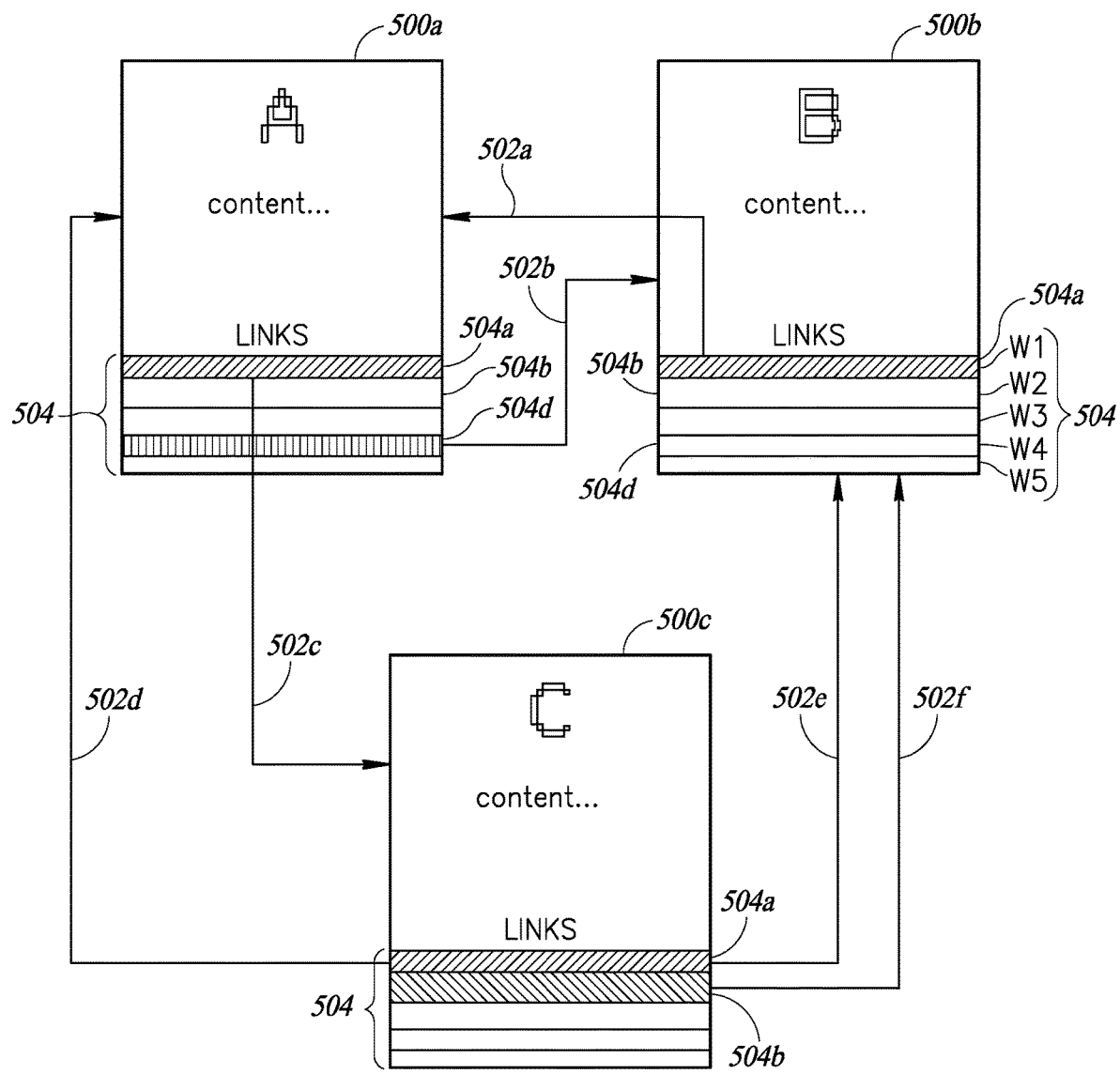
FIG. 5 is a schematic diagram of multiple markup language pages containing data captured by one or more ADC readers in which an analyzer module executed by a server has created multiple hyperlinks between the markup language documents, according to one illustrated implementation.

FIG. 5 shows exemplary multiple markup language pages (first markup language page 500a, second markup language page 500b, and third markup language page 500c, collectively, "markup language pages 500") containing data captured by one or more ADC readers 100, according to one illustrated implementation. As shown in FIG. 5, the analyzer module 418 executed by the server 106 has created multiple hyperlinks 502 between the markup language pages 500. To create the hyperlinks 502, the analyzer module 418 first detects similarities between the metadata 504 stored in the multiple markup language documents 500. The analyzer module 418 then creates hyperlinks 502 between those markup language documents 500 that are sufficiently similar. To detect similarities, the analyzer module 418 compares the values and data held within the metadata fields 504 of one markup language document 500 with the values and data held within the corresponding metadata fields 504 for the other markup language documents 500 stored by the non-transitory computer-readable medium 402.

For example, as shown in FIG. 5, the analyzer module 418 may compare the data or value stored within the first metadata field 504a in the first markup language document 500a with the corresponding first metadata fields 504a in the second markup language document 500b to detect a match. To detect such a match, the analyzer module 418 compares these two values to determine if they are sufficiently similar, and if so, the analyzer module 418 stores a hyperlink 502 into one or both of the first markup language document 500a and the second markup language document 500b. As shown in FIG. 5, the first hyperlink 502a between the first metadata field 504a of the first markup language document 500a and the second markup language document 500b is stored in only the second markup language document 500b, and thus, is unidirectional. In some implementations, a hyperlink 502 may be bidirectional in which a hyperlink 502 is stored in both of the associated markup language documents 500. The analyzer module 418 performs the same comparison for each of the remaining metadata fields 504b-504e in the first markup language document 500a and the second markup language document 500b. As shown in FIG. 5, the analyzer module 418 identifies a second relationship based on the fourth metadata field 504d between the first markup language document 500a and the second markup language document 500b. As a result, the analyzer stores a second hyperlink 502b, also unidirectional, with the first markup language document 500a.

The analyzer module 418 may perform the same comparison for each of the metadata fields 504a-504e for each of the markup language documents 500 to detect further similarities. Thus, as shown in FIG. 5, the analyzer module 418 also detected a similarity for the first metadata field 504a between the first markup language document 500a and the third markup language document 500c. In this instance, the analyzer module 418 stores a third hyperlink 502c associated with the first metadata field 504a of the first markup language document 500a, and the analyzer module 418 stores a fourth hyperlink 502d associated with the first metadata field 504a of the third markup language document 500c. The third hyperlink 502c and the fourth hyperlink 502d may collectively be considered a bidirectional hyperlink. The analyzer module 418 further detected similarities associated with each of the first metadata field 504a and the second metadata field 504b in the second markup language document 500*b* and the third markup language document 500*c*. As a result, the analyzer module 418 stores a fifth hyperlink 502*e* associated with the first metadata field 504*a* in the third markup language document 500*c*, and the analyzer module 418 stores a sixth hyperlink 502*f* associated with the second metadata field 504*b* also in the third markup language document 500*c*. The analyzer module 418 may continue this process for each of the markup language document 500 stored within the server 106. The analyzer module 418 may perform this process each time it receives a markup language document 500 from an ADC server 100, such that the hyperlinks 502 stored within the markup language documents 500 may be dynamically updated as new markup language documents 500 are received.

In some implementations, the analyzer module 418 uses a threshold value to detect similarities between the data or values contained within corresponding metadata fields 504 of different markup language documents 500. Thus, as shown in FIG. 5, the analyzer module 418 will compare the values in the first metadata field 504*a* of the first markup language document 500*a* and the second markup language document 500*b* to identify differences between the two values. The analyzer module 418 may then compare this difference to the threshold value for the first metadata field 504*a*, to determine if the threshold value criteria is met. If the threshold value criteria is met, then the analyzer module 418 may store a hyperlink 502 in either or both of the first markup language document 500*a* and the second markup language document 500*b*. As an example, the second metadata field 504*b* may store location data each of the markup language documents 500. To detect a similarity for the second metadata field 504*b*, the analyzer module 418 may compare the location values held in the second metadata fields 504*b* of the first markup language document 500*a* and the second markup language document 500*b* to determine if the comparison of the values satisfies a threshold condition. For the location values, for example, the analyzer module 418 may consider whether the respective locations do not exceed a specified threshold d, e.g., within a specified distance of each other, are within the same building, are within the facility, etc., for the threshold criteria to be met. If the two location values are sufficiently similar to satisfy the threshold condition, then the analyzer module 418 places a hyperlink 502 within one or both of the associated markup language documents 500. In some comparisons, by contrast, the comparison between the data values may need to result in a score that exceeds a threshold value for the threshold criteria to be met. For example, a string comparison of data values may need to result in a certain percentage of the respective strings being the same to satisfy the threshold criteria.

The type of comparison and threshold depends at least in part on the type of data held within the metadata field 504. For example, for location data, distances or geographic boundaries may be used as thresholds. For some metadata fields 504, though, the analyzer module 418 may use different types of comparisons, such as a raw string comparison or matching criteria, to compare the metadata fields 504. Further, in some implementations, the comparison for similarity by the analyzer module 418 is performed across all of the metadata fields 504, wherein an aggregate similarity score for all five metadata fields 504 must exceed an aggregate threshold value before the analyzer module 418 saves a hyperlink 502. As a result, the analyzer module 418 may be considered an "inverse" Web crawler that sets and stores hyperlinks 502, instead of merely detecting hyperlinks 502 as performed by conventional Web crawlers.

Figure 6:
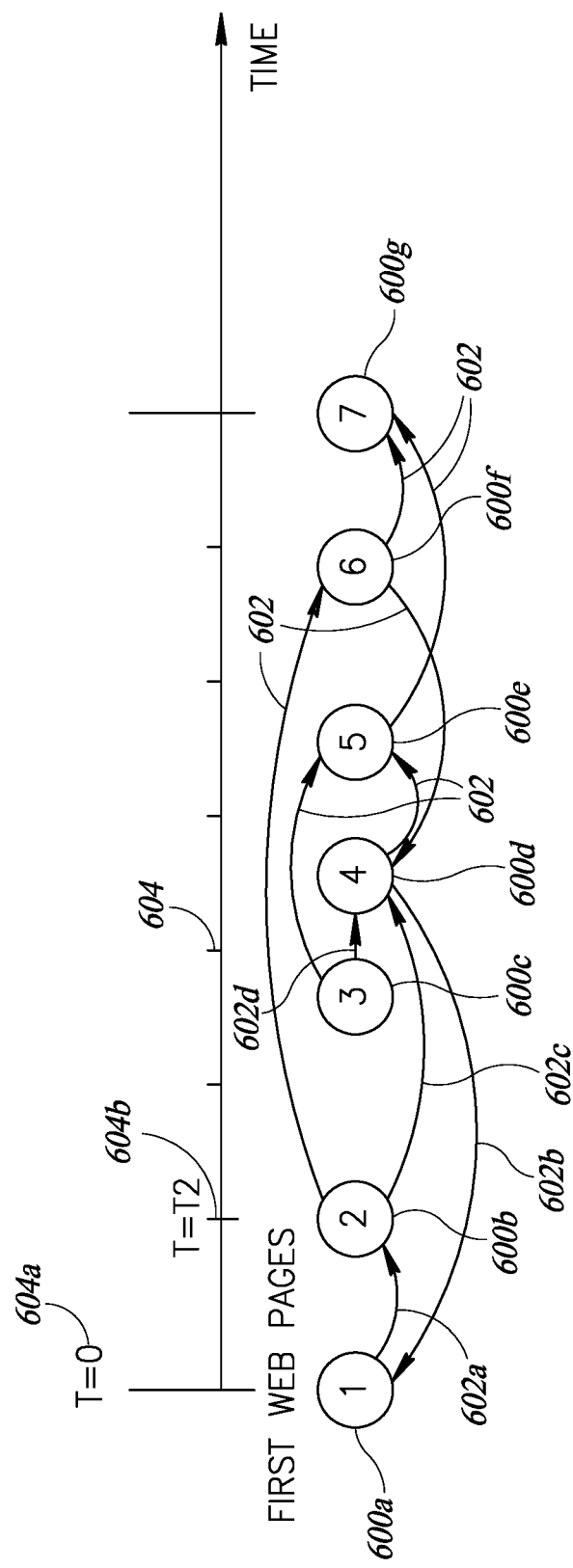
FIG. 6 is a timeline showing a distribution of directional hyperlinks between different markup language pages containing data captured by one or more ADC readers at different times, according to one illustrated implementation.

FIG. 6 is a timeline showing a distribution of directional hyperlinks 602 between different markup language pages 600 containing data captured by one or more ADC readers 100 at different times, according to one illustrated implementation. As noted above, the hyperlinks 602 created between markup language pages 600 may be unidirectional and stored within only one of the associated markup language documents 600. Alternatively, the hyperlinks 602 created between markup language pages 600 may be a bidirectional and stored within each of the associated markup language documents 600. In conventional systems, hyperlinks denote a citation from a first conventional markup language document (the citing document) to a second conventional markup language document (the cited document). The data collected by the ADC readers 100, by contrast, does not contain hyperlinks 602 or citations to other data. Accordingly, the use of hyperlinks 602 by the analyzer module 418, in which the analyzer module 418 sets and saves hyperlinks 602 upon detecting a sufficient similarity between markup language documents 600, differs from such use by conventional systems.

In some implementations, the analyzer module 418 may use a probability function that has a weighting value used to determine the direction of the directional hyperlinks 602 to be stored for associated markup language documents 600. The probability function may be any known probability function and should not be considered limiting. In addition, the analyzer module 418 may execute the probability function to make the hyperlinks 602 exclusively unidirectional. Alternatively, in some implementations, the analyzer module 418 may execute the probability function such that at least some of the hyperlinks 602 are bidirectional. The weighting value may be specified at any time, even before the server 106 begins receiving markup language documents 600. Moreover, the weighting function and weighting value may be dynamically modified by the user or by another process on or in communication with the server 106 even when the server 106 is in operation.

As shown in FIG. 6, the probability function may be based upon a time 604 that the object identification information 306 contained with the content field 302 of the markup language document 600 was captured. Further, the probability function may be weighted to favor storing hyperlinks 602 in either the earlier created or the later created associated markup language pages 600. Thus, as shown in FIG. 6, for example, the probability function used by the analyzer module 418 may favor placing hyperlinks 602 in earlier created markup language documents 600 that link to later created markup language documents 600. Accordingly, the analyzer module 418 in FIG. 6 has a weighting of 0.8 out of 1.0 set for the probability function favoring hyperlinks 602 pointing from a relatively earlier markup language document 600 to an associated later markup language documents 600. In such an implementation, the analyzer module 418 has a corresponding weighting of 0.2 out of 1.0 set for the probability function for saving hyperlinks 602 pointing from the relatively later markup language documents 600 to an associated earlier markup language documents 600. Because of these relative weightings, the later markup language documents 600 are more likely to be the "linked" pages and the earlier markup language documents 600 are more likely to be the "linking" pages. As a result, the relative "score" of the later markup language documents 600 in a Web based search engine may be relatively higher than the scores of the earlier markup language documents 600.

As further shown in FIG. 6, as each new markup language page 600 is received, the analyzer module determines if any of its metadata fields 604 (not shown) are sufficiently similar to values in corresponding metadata fields 604 of previously received markup language pages 600. As an example, when the second markup language document 600b is received at time T2 604b, the analyzer module 418 determines that at least one of the metadata fields 604 in the second markup language document 600b is sufficiently similar to the corresponding metadata field 604 in the first markup language document 600a. The analyzer module 418 then executes a probability function, which results in a unidirectional link 602a in which the first markup language page 600a is the citing document and the second markup language document 600b is the cited document.

The analyzer module 418 performs the same processes when receiving additional markup language pages 600c-600g. Thus, when the third markup language document 600c is received, the analyzer module 418 determines that none of the metadata stored in the third markup language document 600c is sufficiently similar to the metadata stored in either of the first markup language document 600a or the second markup language document 600b. When the fourth markup language document 600d is received, the analyzer module 418 identifies similar metadata between the fourth markup language document 600d and each of the three previously stored markup language documents 600a-600c. The analyzer module 418 runs the probability function for each of these relationships—between the fourth markup language document 600d and each of the first markup language document 600a, the second markup language document 600b, and the third markup language document 600c—to determine the type (e.g., unidirectional or bidirectional) and the direction of hyperlink to save. As a result of executing the probability function in each relationship, the analyzer module 418 saves a second hyperlink 602b within the fourth markup language page 600d that points back to the first markup language page 600a. The analyzer module 418 further saves a third hyperlink 602c within the second markup language page 600b and a fourth hyperlink 602d within the third markup language page 600c, both of which point to the fourth markup language page 600d. Thus, as a result of executing the probability function for each of these three connections, the analyzer module 418 dynamically created three additional hyperlinks 602b-602d, making the fourth markup language page 600d the cited document in two situations and the citing document in one situation. This process continues as each of the fifth hyperlink markup document 600e, the sixth hyperlink markup document 600f, and seventh hyperlink markup document 600g are received by the server 106.

Figure 7:
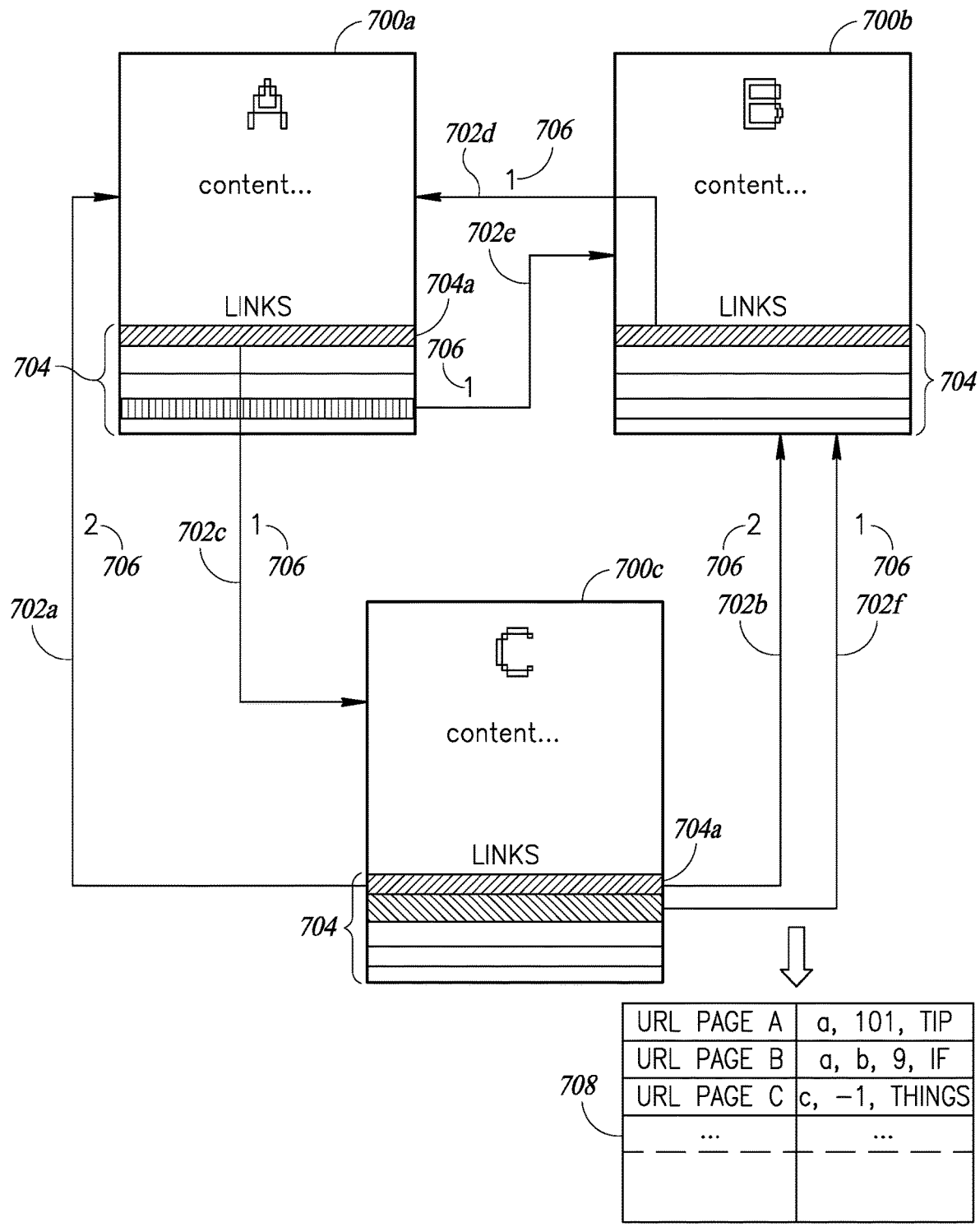
FIG. 7 is a schematic diagram of multiple markup language pages containing data captured by one or more ADC readers in which a rankings engine executed by a server has assigned weights to the various hyperlinks between the markup language documents, according to one illustrated implementation.

FIG. 7 shows multiple exemplary markup language pages 700 containing data captured by one or more ADC readers 100 in which a rankings engine 420 executed by the server 106 has assigned weights 706 to the various hyperlinks 702 between the markup language documents 700, according to one illustrated implementation. As shown in FIG. 7, the weights 706 may be determined by the number of outgoing hyperlinks 702 for each metadata field 704 in a markup language document 700. As an example, as shown in FIG. 7, the first metadata field 704a in the third markup language page 700c may have two outgoing hyperlinks, a first hyperlink 702a that goes to the first markup language document 700a and a second hyperlink 702b that goes to the second markup language document 700b. As a result, the weightings 706 for each of the first hyperlink 702a and the second hyperlink 702b is set to two. Continuing, the weight 706 associated with the third hyperlink 702c equals one because the first metadata field 704a in the first markup language document 700a has only one hyperlink (third hyperlink 702c), which goes to the third markup language document 700c. Likewise, the remaining weights 706 are all equal to one because the respective metadata fields have only one hyperlink 702 (shown as fourth hyperlink 702d, fifth hyperlink 702e, and sixth hyperlink 702f) going to another markup language document 700.

The rankings engine 420 may use the weights 706 to calculate scores for the various markup language documents 700 that are received and stored by the server 106, as discussed in subsequent paragraphs. The rankings engine 420 may further use the scores to rank the markup language documents 700 stored by the server 106. The rankings engine 420 may use various methods to score and rank the markup language documents 700. In such an implementation, "linked" documents 700 that are cited by many other documents 700 will have a relatively higher score when compared to "linking" documents 700 that contain citations to many other documents 700.

The rankings engine 420 may rank each markup language document 700 "k" according to the following equation:

$$R(k) = (1-G) + G \sum_{j=1}^{N_k} \left( \sum_{i=1}^{5} \frac{w_{ij} \times R(j)}{L_{ij}} \right) \quad \text{Equation 1}$$

In Equation 1, the G factor (chosen between 0 and 1, exclusive) represents the probability that, in a mathematical model defining a random walk over the markup language documents, there is a transition from one markup language document to a second markup language document. The value (1−G) is the probability to stop over a markup language document. In some implementations, the value of G is set to be very close to 1 (e.g., G=0.9). "$N_k$" is the total number of markup language documents that contain at least a link to markup language document 700 "k". In Equation 1, R(k) denotes the ranking score of each markup language document "k," $w_{ij}$ represents the weight assigned to the associated metadata field 704, R(j) represents the ranking scores of markup language document "j," and $L_{ij}$ represents the weight 706 of the hyperlink 702 for the associated metadata field 704. To calculate the ranking score R(k) for the markup language document "k," the rankings engine 420 calculates the sum of the weighted ranking score for each markup documents "j" that has a hyperlink pointing to the markup language document 700 "k." The rankings engine 420 calculates the weighted ranking score for each markup document "j" by multiplying the weighted ranking "$w_{ij}$" for the associated metadata field "i" in the linking markup language page "j" by the ranking scores R(j) of the linking markup language page "j," and dividing this product by the weight "$L_{ij}$" of the hyperlink 702 for metadata field "i" between markup language pages "k" and "j."

The rankings engine 420 may assign respective weights "$w_i$" to each of the metadata fields 704 in a markup language document 700 to be used in calculating the ranking score according to Equation 1. The sum of the weights "$w_i$" for all metadata fields 304 in a single markup language document 300 may be set equal to one. The following chart shows an exemplary set of weightings for the three markup language documents 300a-300c shown in FIG. 7 with each document 300a-300c having five metadata fields 304a-304e:

| Metadata Field | Document 700a | Document 700b | Document 700c |
|---|---|---|---|
| 704a | $w_{1a} = 0.4$ | $w_{1b} = 0.4$ | $w_{1c} = 0.4$ |
| 704b | $w_{2a} = 0.1$ | $w_{2b} = 0.1$ | $w_{2c} = 0.1$ |
| 704c | $w_{3a} = 0.1$ | $w_{3b} = 0.1$ | $w_{3c} = 0.1$ |
| 704d | $w_{4a} = 0.2$ | $w_{4b} = 0.2$ | $w_{4c} = 0.2$ |
| 704e | $w_{5a} = 0.2$ | $w_{5b} = 0.2$ | $w_{5c} = 0.2$ |

The ranking score R(k) for each markup language document 700 can be obtained by solving the following series of equations:

$$R(A)=(1-G)+G(w_{1b}(R(B))+\tfrac{1}{2}(w_{1c}(R(C))))$$

$$R(B)=(1-G)+G(w_{4a}(R(A))+\tfrac{1}{2}(w_{1c}(R(C)))+w_{2c}(R(C)))$$

$$R(C)=(1-G)+G(w_{1a}(R(A)))$$

The rankings engine 420 can dynamically update the ranking values for the markup language documents 700 as new markup language documents 700 are received by the server 106 and as the analyzer 418 identifies and stores additional hyperlinks 702.

The server 106 may store the ranked markup language document 700 in an indexed table 708 stored within the nontransitory storage media 402 that may include the ranked score along with other data from the corresponding markup language documents 700. The indexed table 708 may be designed and updated to facilitate searches using Web-based search technology and capabilities. In some implementations, a separate indexed table 708 may be designed to exclusively store image data. In some implementations, as discussed below, the server 106 receives a search query 108 via the network 412 seeking information or data collected from the ADC reader 100. The server may execute one or more Web based search programs to obtain results in response to the received query 108, and then return those results also via the network 412.

Figure 8A:
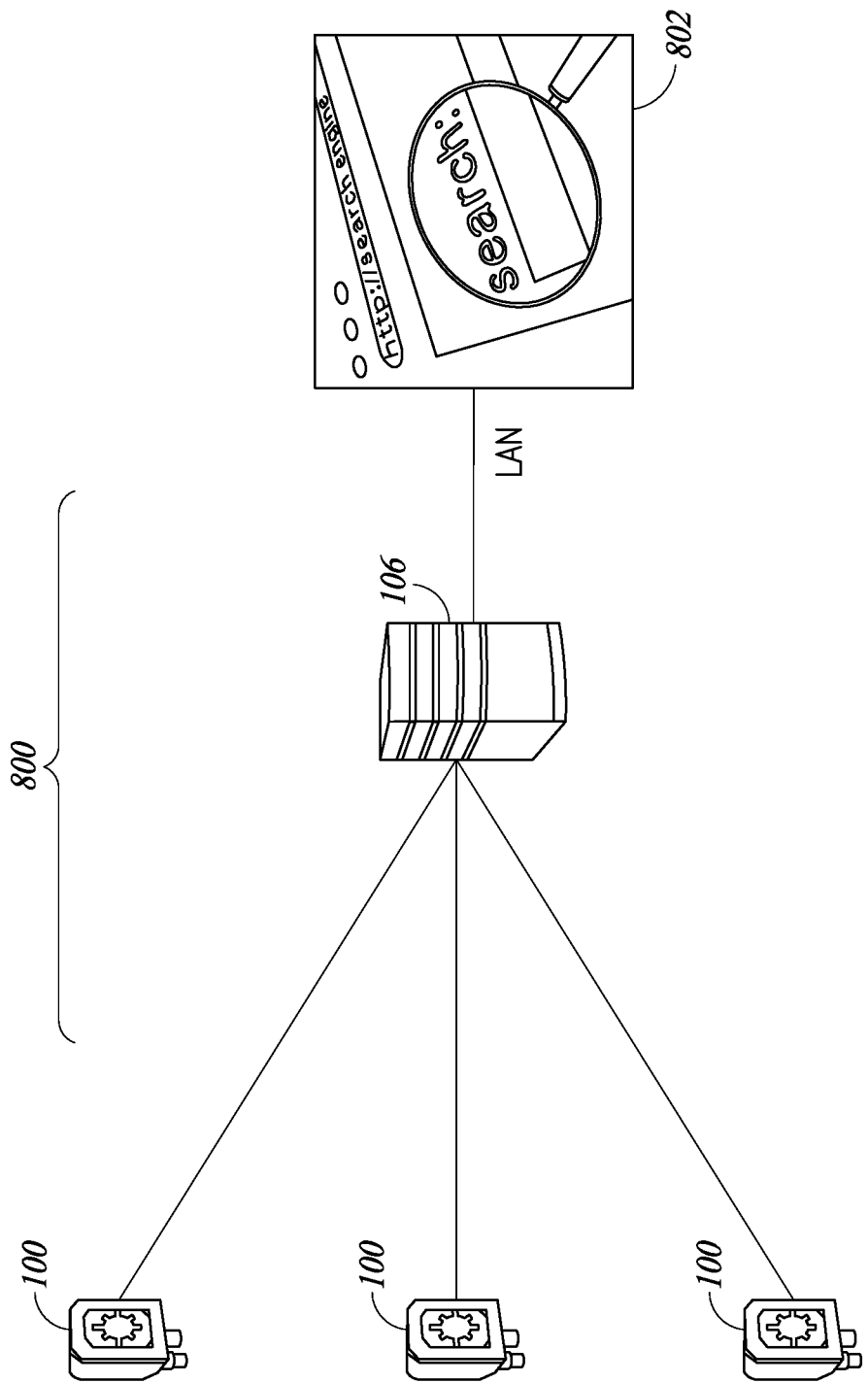
FIG. 8A a schematic diagram that illustrates a search scenario for data collected by a network of ADC readers in which a search is received and processed using resources on a private network, according to one illustrated implementation.
Figure 8B:
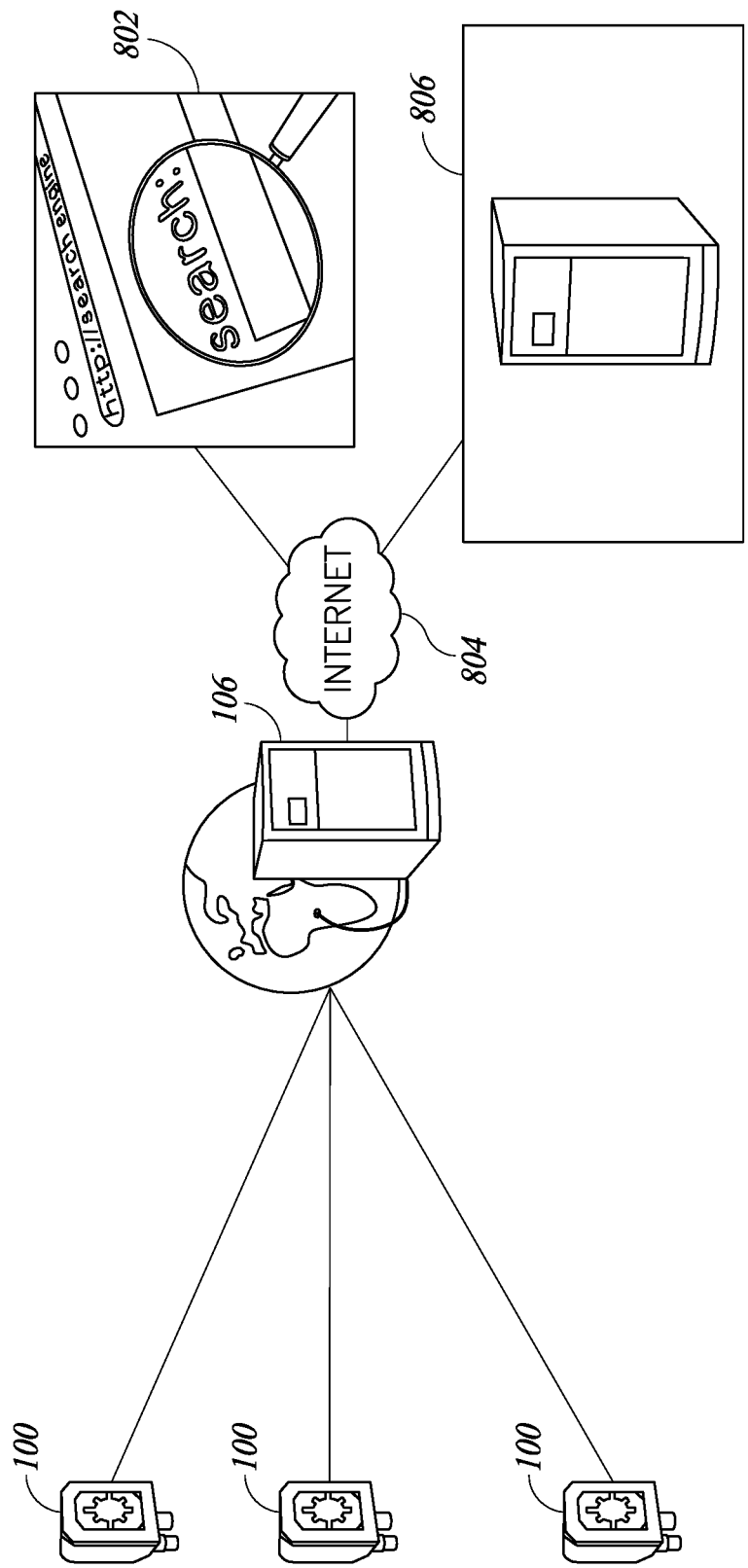
FIG. 8B a schematic diagram that illustrates a search scenario for data collected by a network of ADC readers in which a search is received and processed using resources on the Internet, according to one illustrated implementation.
Figure 8C:
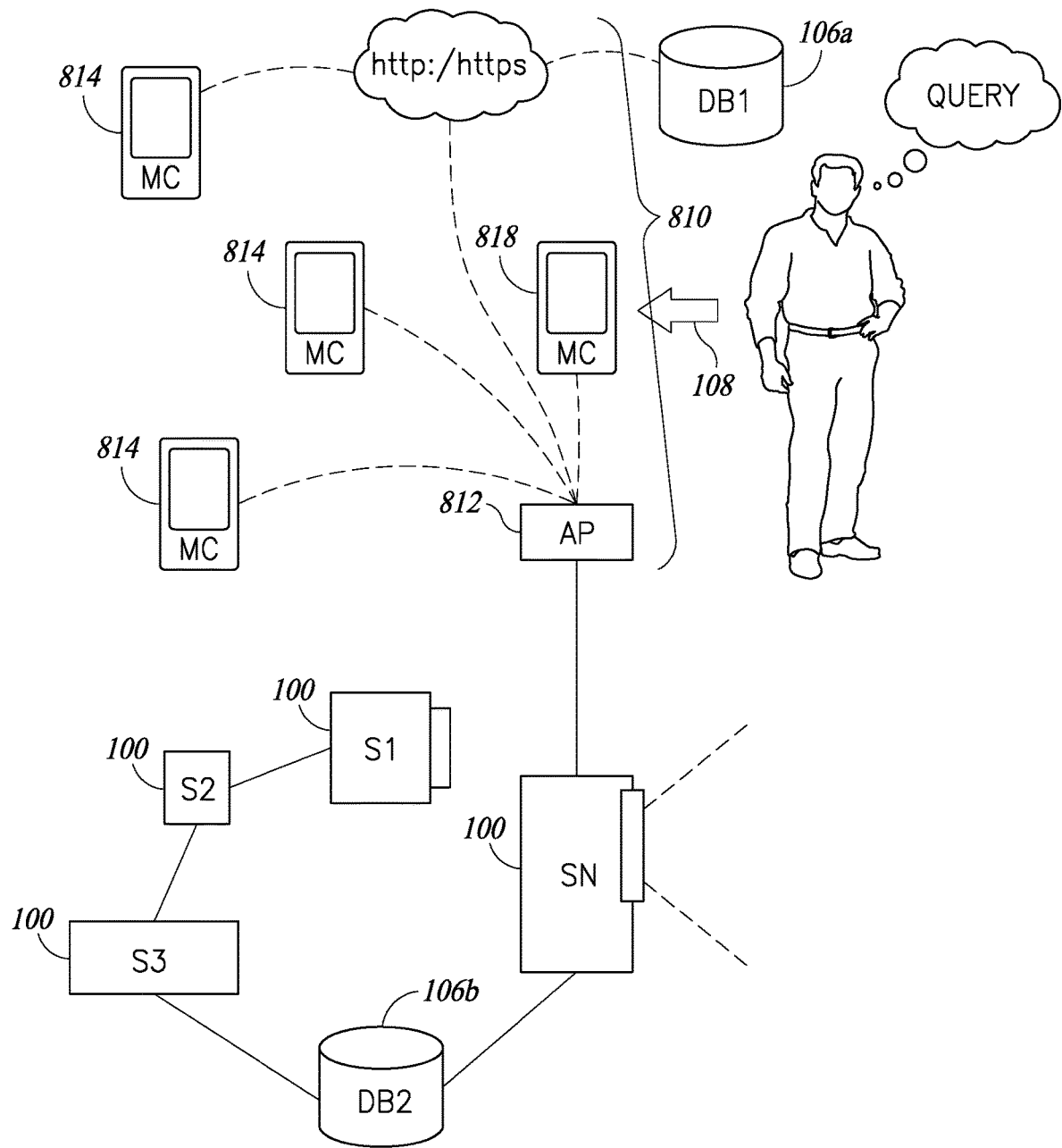
FIG. 8C a schematic diagram that illustrates a search scenario for data collected by a network of ADC readers in which a search is requested from a mobile network, according to one illustrated implementation.

FIGS. 8A, 8B, and 8C illustrate different searching scenarios involving the network of ADC readers 100 and the server 106. In FIG. 8A, the ADC readers 100 and the server 106 have network connected that are part of a private LAN 800 or intranet that is not connected to the Internet. The ADC readers 100 may be different types of readers that identify and collect different types of data. As shown in FIG. 8A, the request 802 is received via the private LAN 800, enabling the operator of the LAN 800 to limit the data sources that may be accessed by the server 106. In FIG. 8B, one or more of the ADC readers 100 and the server 106 may be connected to the Internet 804. As a result, in addition to the search capabilities offered via the analyzer 418 and the rankings engine 420, the server 106 may further supplement the search capabilities by drawing upon information sources 806 accessible through the Internet 804. In addition, the server 106 may be enabled to allow Web based searches from any location that has Internet access. In FIG. 8C, the search capabilities of the servers 106a and 106b (collectively, "server 106") are accessed through one or more mobile devices 818. Other mobile device 814 may be used to execute instructions to obtain data from data carriers 118 and/or to provide a distributed analyzer 418 or rankings engine 420 in some implementations. As shown in FIG. 8C, multiple ADC readers 100 may be connected to one or more servers 106 via a network 810. The network 810 may further serve to provide a connection to the various servers 106a and 106b, enabling the servers 106 to operate and function together. The network 810 may further have an access point 812 that enables the mobile device 818 to submit queries 108 to the collection of servers 106. After processing the query 108 and determining a response, the servers 106 may provide a response via the network 810 to the mobile device 818. The response, for example, may be in the form of a list of links to various search results, such as those provided by Web based search engines.

Figure 9:
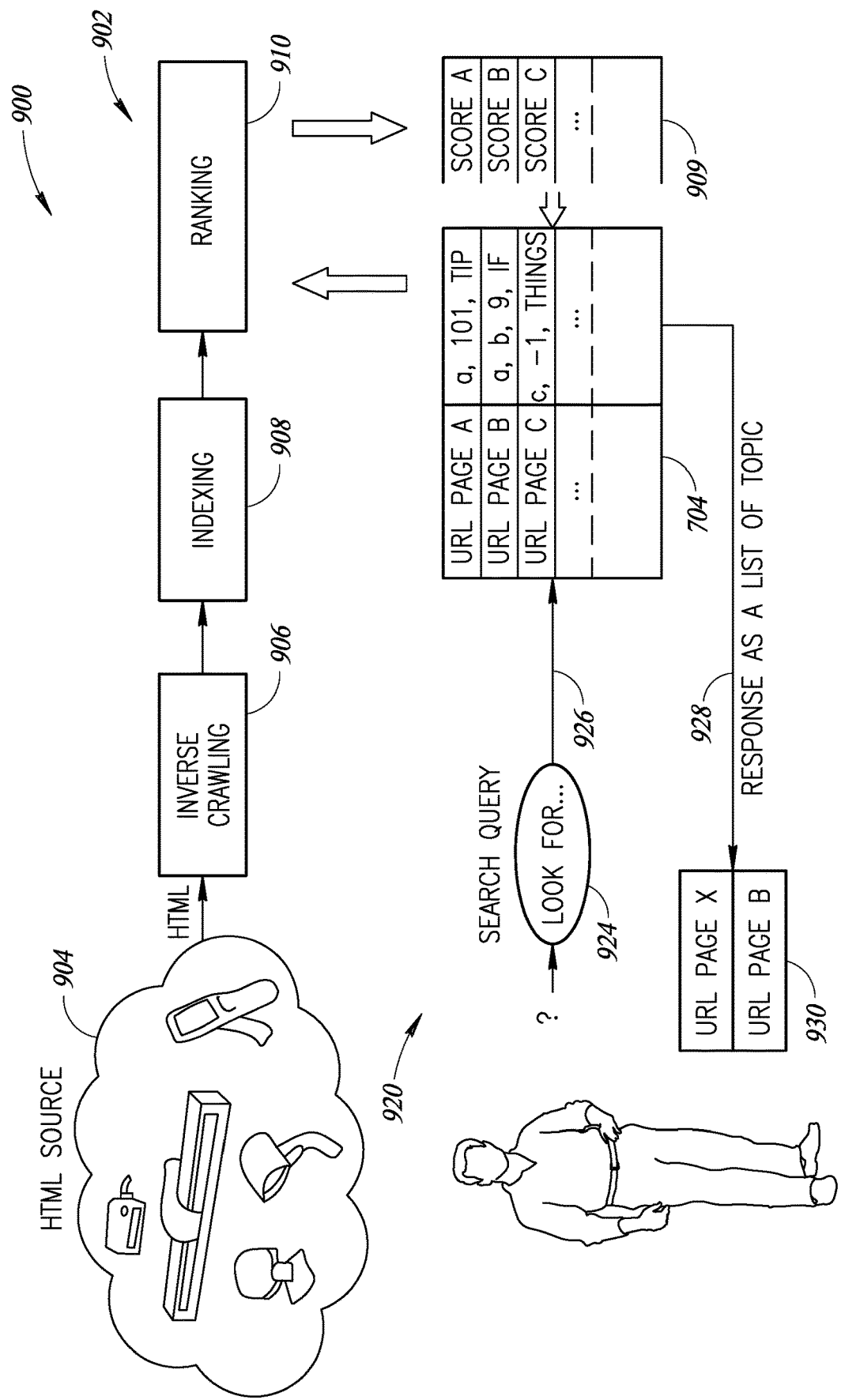
FIG. 9 is a schematic diagram that illustrates an interaction between collecting and processing data received from a network of ADC readers, and responding to queries received over a network, according to one illustrated implementation.

FIG. 9 illustrates an interaction 900 between collecting and processing data received from a network of ADC readers 100, and responding to queries 924 received over a network, according to one illustrated implementation. A collecting and processing of data 902 is shown in the top of the illustration of the interaction 900. The collecting and processing flow begins at 904 by collecting data by one or more ADC readers 100 data carriers 118 attached or associated with various objects 116. The ADC readers 100 store the collected data in HTML pages 300 and associate various metadata values 304 with the collected data within the HTML pages 300. The ADC readers 100 may be a heterogeneous group of ADC readers 100 that collect data from different types of data carriers 118 that are associated with different types of objects 116. The ADC readers 100 transmit the HTML pages 300 to the server 106.

The collecting and processing 902 then proceeds to 906 in which the received HTML pages 300 are examined to identify associated pages 300. Upon identifying associated HTML pages 300, hyperlinks 502 are stored as part of one or both of the associated HTML pages 300. In some implementations, the inverse crawling uses a probability function to determine the type (e.g., unidirectional or bidirectional) and/or direction of the hyperlink 502.

The collecting and processing 902 then proceeds to 908 in which the HTML pages 300 are indexed. The indexing at 908 may be based at least in part upon the hyperlinks 502 and metadata 304 that have been stored with the various HTML pages 300. The indexing at 908 results in an indexed table 704 where the results can be accessed in response to a query 924.

The collecting and processing 902 then proceeds to 910 in which the indexed HTML pages 300 are scored and ranked, with the results being stored as part of column or table 909. The scoring may be based, at least in part, on the hyperlinks 502 that have been stored with the various HTML pages 300. The collecting and processing 902 may continue dynamically as new HTML pages 300 are received from the ADC readers 100.

A query process 920 is shown at the bottom of the illustration. The query process 920 begins when a user or process submits a query 924 to the server 106. The query 924 may be submitted via a user interface such as those user interfaces that are used by Web based search engines. Query process 920 proceeds to 926, in which the server 106 processes the query 924 to identify related entries in the indexed table 704. The identification of items related to the query 924 may be performed by such processes as those used to perform searching over the Internet or Web. In some implementations, the searching uses the relative weights of the entries in the indexed table 704, along with the hyperlinks 502 between HTML pages 300 to identify relevant HTML pages 300. The results of the search are then transmitted at 928 to the user's device or the process in the form of a list of hyperlinks 930 that provide links to the relevant HTML pages 300 stored by the server 106. The list of hyperlinks 926 may be ordered in terms of the relative strength of each of the associated HTML pages 300 in response to the query 924.

Figure 10:
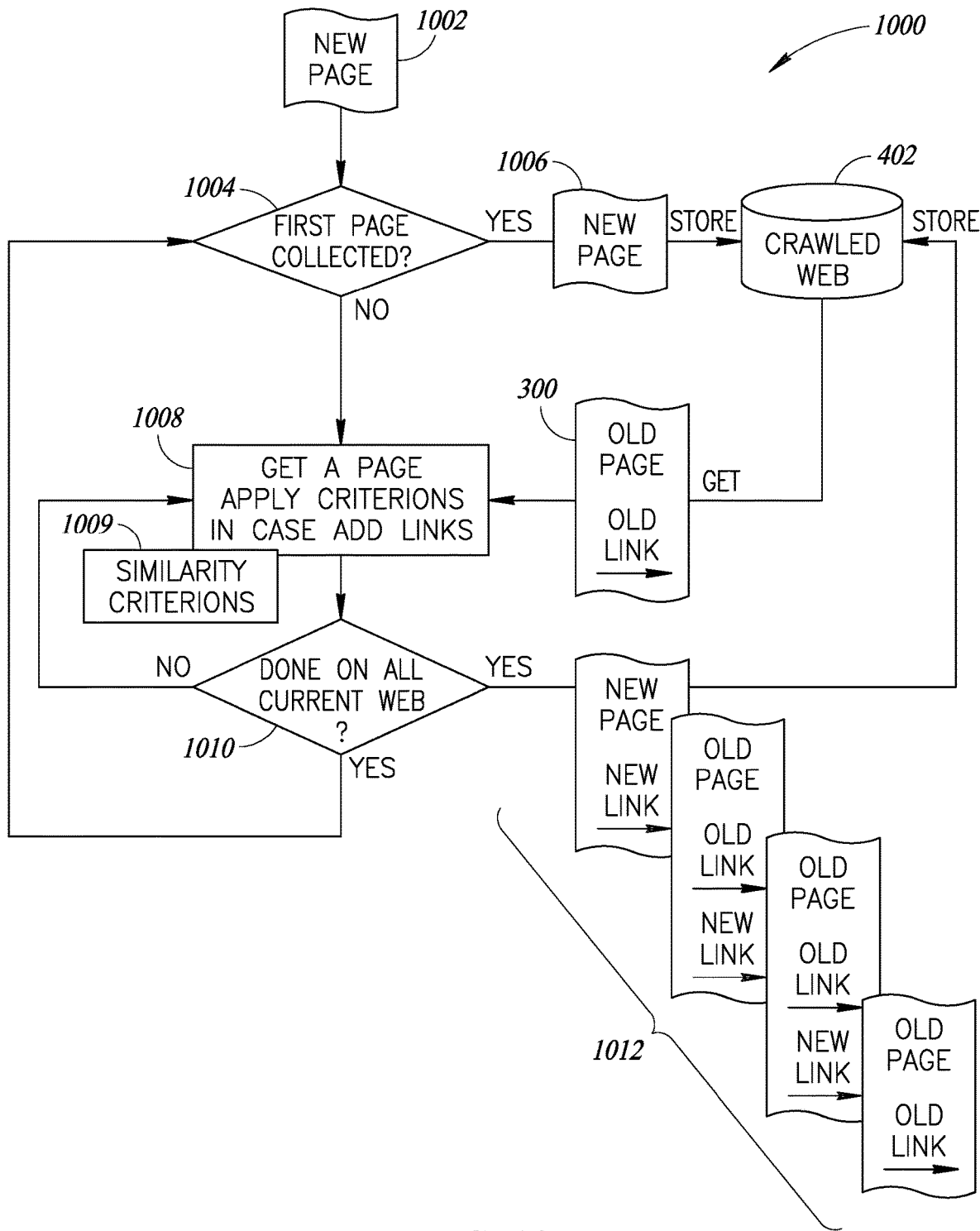
FIG. 10 is a flow chart that illustrates the dynamic collection and processing of markup language documents, according to one illustrated implementation.

FIG. 10 shows a method 1000 that illustrates the dynamic collection and processing of a markup language document 300, according to one illustrated implementation. At 1002, the markup language page 300 is received. In some implementations, the markup language page 300 is received from an ADC reader 100 and contains object identification data 306 obtained from a data carrier 118.

At 1004, the analyzer module 418 determines if the markup language page 300 is the very first markup language page 300 that it has received. If so, then a new markup language page 300 is stored by the server 106 in memory 402 at 1006. If the markup language page 300 is not the first such page that the server 106 has received, then the method proceeds to 1008 to obtain the similarity criteria 1009 for each of the metadata fields 304 contained as part of the markup language page 300. A previously received markup language page 300 is also accessed from the memory 402 of server 106 at 1008. A comparison between the metadata fields 304 of the currently received markup language page 300 and the previously received markup language page 300 is performed to determine if there is a sufficient similarity in any of the metadata fields 304 to satisfy the similarity criteria. If so, then a link is placed in either or both of the currently or previously received markup language pages 300.

At 1010, the analyzer module 418 determines if it has compared the previously received markup language page 300 with all of the previously received markup language pages. If not, and additional markup language pages 300 need to be compared to the currently received markup language page 300, then the method 1000 returns to 1008, and continues to proceed through 1008 and 1010 until a comparison is performed with all of the previously received markup language pages 300. When a comparison has been performed with all of the previously received markup language pages 300, then the set of markup language pages 1012, with new or updated links included, is transmitted to the server 106 to be ranked and indexed, and stored in memory 402. In addition, the method proceeds back to 1004 to await the receipt of additional markup language pages 300 from the ADC readers 100.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified.

The various implementations described above can be combined to provide further implementations. In addition, all of the U.S. patents, U.S. patent application publications, U.S. patent applications, foreign patents, foreign patent applications and non-patent publications referred to in this specification and/or listed in the Application Data Sheet, if any, as well as U.S. patent application Ser. No. 14/871,542 titled "DATA COLLECTION SYSTEM AND METHOD THAT DETECT ELECTRONIC DEVICE DISPLAYS VIA FRESNEL PATTERNS," filed Sep. 30, 2015; U.S. patent application Ser. No. 15/038,565, titled "OPTICAL CODE READING SYSTEM WITH DYNAMIC IMAGE REGIONALIZATION," filed May 23, 2016; and International Application No. PCT/IT2013/000332, titled "OPTICAL CODE READING SYSTEM WITH DYNAMIC IMAGE REGIONALIZATION," filed Nov. 28, 2013, are incorporated herein by reference, in their entirety. Aspects of the embodiments can be modified, if necessary, to employ concepts of the various patents, applications and publications to provide yet further embodiments. These and other changes can be made to the implementations in light of the above-detailed description.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A machine-implemented method of operation for an inverse crawling device to prepare data collected by one or more automatic data collection (ADC) readers operative to read data from one or more data carriers associated with one or more objects within reading proximity of the one or more ADC readers, the method comprising:

receiving, via a first transceiver, first object identification data associated with a first object and transmitted from an ADC reader, the first object identification data encapsulated within a first markup language document, wherein the first markup language document includes at least one piece of first metadata related to the first object identification data;

receiving, via the first transceiver or via a second transceiver, second object identification data associated with a second object and transmitted from an ADC reader, the second object identification data encapsulated within a second markup language document, wherein the second markup language document includes at least one piece of second metadata related to the second objection identification data, wherein the at least one piece of first metadata includes at least one of time data, location data, type of first ADC reader data, network identification data for the first ADC reader, and an indication of whether a measurement of the first object identification data was successful, wherein each type of data occupies a separate metadata field in the first markup language document;

autonomously identifying, by a document analyzer executing on hardware-based server, a relationship between the at least one piece of first metadata and the at least one piece of second metadata including determining that a similarity criterion between the at least one piece of first metadata and the at least one piece of second metadata exceeds a threshold value by comparing values and/or data held within the metadata fields of the first markup language document with the values and/or data held within the corresponding metadata field for the second markup language document;

autonomously creating, by the document analyzer, in the first markup language document, a hyperlink to the second markup language document, wherein the hyperlink is created for each metadata field satisfying the threshold value for the similarity criterion in response to the identified relationship between the at least one piece of first metadata and the at least one piece of second metadata;

receiving, from a user interface, a query related to the first object;

autonomously providing, for presentation via the user interface, results that include the first markup language document in response to the query.

2. The method of claim 1 wherein the ADC reader is chosen from the group consisting of a machine-readable symbol reader for optically reading information from machine-readable symbols, a radio frequency identification (RFID) interrogator, a magnetic stripe reader, and an optical character recognition (OCR) scanner.

3. The method of claim 1 wherein the first object identification data and the at least one piece of first metadata are encapsulated within the first markup language document by the ADC reader.

4. The method of claim 1 where the hyperlink between the first markup language document and the second markup language document is a directional hyperlink indicating that the first markup language document includes a citation to the second markup language document.

5. The method of claim 4 further comprising applying a probability function having a probability parameter to each identified relationship to determine a type and direction for the directional hyperlink, the probability parameter having been set before the directional hyperlink is created.

6. The method of claim 5 wherein the probability parameter is based on a comparison of a first time that the first object identification data is captured and a second time that the second object identification data is captured.

7. The method of claim 1 further comprising:
searching markup language documents containing object identification data in response to receiving the query, wherein the searching is performed using a Webpage search engine.

8. The method of claim 1, further comprising:
indexing the first markup language document and the second markup language document in an indexed table.

9. The method of claim 1 wherein the first object identification data is captured by a first ADC reader from a first carrier associated with a first object at a first time and the second object identification data is captured by the first ADC reader from a second carrier associated with a second object at a second time.

10. The method of claim 1 wherein the first object identification data is captured by a first ADC reader from a first data carrier associated with a first object at a first time, and the second object identification data is captured by a second ADC reader from the first data carrier associated with the first object at a second time.

11. The method of claim 1 wherein the first object identification data includes at least one identifier that uniquely identifies the first object from other objects having respective identifiers.

12. The method of claim 1 wherein the query is received from a mobile device.

13. An inverse markup-page crawler system comprising:
one or more transceivers operative to receive transmitted data that was collected by one or more automatic data collection (ADC) readers operative to read data from one or more data carriers associated with one or more objects within reading proximity of the one or more ADC readers;
the transmitted data including:
first object identification data associated with a first object and encapsulated within a first markup language document, wherein the first markup language document includes at least one piece of first metadata related to the first object identification data; and
second object identification data encapsulated within a second markup language document, wherein the second markup language document includes at least one piece of second metadata related to the second objection identification data, wherein the at least one piece of first metadata includes at least one of time data, location data, type of first ADC reader data, network identification data for the first ADC reader, and an indication of whether a measurement of the first object identification data was successful, wherein each type of data occupies a separate metadata field in the first markup language document; and
computing hardware including processing and memory circuitry operative to implement:
a markup language document analyzer that, when executed:
identifies a relationship between the at least one piece of first metadata and the at least one piece of second metadata including determining that a similarity criterion between the at least one piece of first metadata and the at least one piece of second metadata exceeds a threshold value by comparing values and/or data held within the metadata fields of the first markup language document with the values and/or data held within the corresponding metadata field for the second markup language document; and
creates in the first markup language document a hyperlink to the second markup language document for each metadata field satisfying the threshold value for the similarity criterion, wherein the hyperlink is created in response to identified relationship between the at least one piece of first metadata and the at least one piece of second metadata; and
a query responder that, when executed, responds to a query related to the first object providing results that include the first markup language document.

14. The system of claim 13 wherein the at least one ADC reader is chosen from the group consisting of a machine-readable symbol reader for optically reading information from machine-readable symbols, a radio frequency identification (RFID) interrogator, a magnetic stripe reader, and an optical character recognition (OCR) scanner.

15. The system of claim 13 wherein the first object identification data and the at least one piece of first metadata are encapsulated within the first markup language document by the at least one-ADC reader.

16. The system of claim 13 where the hyperlink between the first markup language document and the second markup language document is a directional hyperlink that indicates that one of the first markup language document includes a citation to the second markup language document.

17. The system of claim 16 wherein the markup language document analyzer is further configured to apply a probability function having a probability parameter to each identified relationship to determine a type and direction for the directional hyperlink, the probability parameter having been set before the directional link is created.

18. The system of claim 17 wherein the probability parameter is based on a comparison of a first time that the first object identification data is captured and a second time that the second object identification data is captured.

19. The system of claim 13 further comprising:
a Webpage search engine that searches markup language documents containing object identification data in response to receiving the query.

20. The system of claim 13, wherein the memory circuitry stores an indexed table of a set of markup language documents, wherein the set of markup language documents includes the first markup language document and the second markup language document.

21. The system of claim 13 wherein the at least one ADC reader captures the first object identification data from a first data carrier associated with a first object at a first time and captures the second object identification data from a second data carrier associated with a second object at a second time.

22. The system of claim 13 wherein the at least one ADC reader captures the first object identification data from a first data carrier associated with a first object at a first time and a second ADC reader capture the second object identification data at a second time, and wherein the second object identification data is from the first data carrier associated with the first object.

23. The system of claim 13 wherein the first object identification data includes at least one identifier that uniquely identifies the first object from other objects having respective identifiers.

24. The system of claim 13 wherein the query is received from a mobile device.

25. An automated method of operation for a machine-implemented ranking system, the method comprising:
receiving, via a first transceiver, first object identification data transmitted from a first automatic data collection (ADC) reader operative to read data from one or more data carriers associated with one or more objects within reading proximity of the first ADC reader, the first object identification data associated with a first object and encapsulated within a first markup language document, wherein the first markup language document includes first metadata related to the first object identification data;
receiving, via the first transceiver, second object identification data transmitted from a second automatic data collection (ADC) reader operative to read data from one or more data carriers associated with one or more objects within reading proximity of the second ADC reader, the second object identification data associated with a second object and encapsulated within a second markup language document, wherein the second markup language document includes second metadata related to the second object identification data, wherein each of the first metadata and the second metadata include metadata fields including at least one of time data, location data, type of first ADC reader data, network identification data for the first ADC reader, and an indication of whether a measurement of the first object identification data was successful, wherein each type of data occupies a separate metadata field;
storing the first object identification data and the second object identification data on computing hardware of the ranking system among a set of markup language documents;
identifying a relationship between the first metadata and the second metadata including determining that a similarity criterion therebetween exceeding a threshold value by comparing values and/or data held within the metadata fields of the first object identification with the values and/or data held within the corresponding metadata field for the second object identification,
ranking, by the ranking system, the first markup language document within the set of markup language documents based at least in part on a set of hyperlinks between the first markup language document and the other markup language documents within the set of markup language documents, wherein the set of hyperlinks between the first markup language document and the other markup language documents are determined based on the first metadata after the first markup language document is received via the transceiver; and
outputting, by the system results in response to a query related to the first object, the results including the first markup language document.

26. The method of claim 25 wherein the first ADC reader is chosen from the group consisting of a machine-readable symbol reader for optically reading information from machine-readable symbols, a radio frequency identification (RFID) interrogator, a magnetic stripe reader, and an optical character recognition (OCR) scanner.

27. The method of claim 25 wherein the first object identification data and the at least one piece of first metadata are encapsulated within the first markup language document by the first ADC reader.

28. The method of claim 25 wherein at least one of the hyperlinks in the set of hyperlinks is a directional hyperlink indicating that the first markup language document cites to another markup language document within the set of markup language documents.

29. The method of claim 28 further comprising applying a probability function having a probability parameter to each identified relationship to determine a type and direction for the directional hyperlink, the probability parameter having been set before the directional hyperlink is created.

30. The method of claim 29 wherein the probability parameter is based on a comparison of a first time that the first object identification data is captured and a second time that the other markup language document is captured.

31. The method of claim 25 further comprising:
searching the set of markup language documents containing object identification data in response to receiving the query, wherein the searching is performed using a Webpage search engine.

32. The method of claim 25 further comprising:
storing in non-transitory computer readable media an indexed table of the set of markup language documents.

33. The method of claim 25 further comprising:
dynamically updating, via the ranking system, the ranking of the set of markup language documents when a new link is added to the set of links.

34. The method of claim 25 wherein the query is received from a mobile device.

35. The method of claim 25 wherein the first object identification data includes at least one identifier that uniquely identifies the first object from other objects having respective identifiers.

36. The method of claim 1 wherein the threshold value includes an individual threshold value for each corresponding individual metadata field.

37. The method of claim 1 wherein the threshold value includes an aggregate threshold value scored across all metadata fields.

38. The method of claim 5 wherein the type of directional hyperlink is selected from a unidirectional hyperlink or a bidirectional hyperlink based on results of applying the probability function.

39. The method of claim 5 wherein the probability function favors placing hyperlinks in earlier created markup language documents that link to later created markup language documents.

40. The method of claim 1 wherein each of the first markup language document and the second markup language document includes a content filed including data related to the object to which the corresponding data carrier is attached or associated with.

* * * * *